(12) United States Patent
Osako

(10) Patent No.: US 10,514,023 B2
(45) Date of Patent: Dec. 24, 2019

(54) WIND TURBINE DRIVING DEVICE AND WIND TURBINE DRIVING DEVICE UNIT

(71) Applicant: NABTESCO CORPORATION, Tokyo (JP)

(72) Inventor: Haruna Osako, Gifu (JP)

(73) Assignee: NABTESCO CORPORATION, Tokyo (JP)

( * ) Notice: Subject to any disclaimer, the term of this patent is extended or adjusted under 35 U.S.C. 154(b) by 772 days.

(21) Appl. No.: 15/101,685

(22) PCT Filed: Nov. 28, 2014

(86) PCT No.: PCT/JP2014/081524
§ 371 (c)(1),
(2) Date: Jun. 3, 2016

(87) PCT Pub. No.: WO2015/083633
PCT Pub. Date: Nov. 6, 2015

(65) Prior Publication Data
US 2016/0305407 A1    Oct. 20, 2016

(30) Foreign Application Priority Data

Dec. 5, 2013 (JP) .................................. 2013-252405

(51) Int. Cl.
*F03D 17/00* (2016.01)
*F03D 7/02* (2006.01)
(Continued)

(52) U.S. Cl.
CPC .......... *F03D 17/00* (2016.05); *F03D 7/0204* (2013.01); *F03D 7/0224* (2013.01);
(Continued)

(58) Field of Classification Search
CPC .............................. F03D 7/0204; F03D 17/00
See application file for complete search history.

(56) References Cited

U.S. PATENT DOCUMENTS 5,035,575 A    7/1991  Nielsen et al.
8,317,462 B2*  11/2012  Daniels ................ F16D 66/025
                                         415/123
(Continued)

FOREIGN PATENT DOCUMENTS

JP    61-200698 U    12/1986
JP    2007-120510 A   5/2007
(Continued)

OTHER PUBLICATIONS

First Notification of Reason for Rejection Chinese Patent Application No. 2014800664392 dated Dec. 27, 2017 with English translation.

(Continued)

*Primary Examiner* — Justin D Seabe
(74) *Attorney, Agent, or Firm* — Pillsbury Winthrop Shaw Pittman, LLP

(57) ABSTRACT

A pinion of an output portion meshes with a ring gear of a wind turbine. A first friction plate is coupled to an output shaft of an electric motor at an end of the output shaft situated further from a speed reducer. A second friction plate contacts with the first friction plate and serves as a brake on the output shaft. Elastic members bias the second friction plate toward the first friction plate. Electromagnet biases the second friction plate in the direction in which the second friction plate is separated from the first friction plate. A detector detects a position and a displacement of a detection target portion fixed on the second friction plate. Based on a result of detection performed by the detector, operation of the second friction plate is detected and checked, and the wear amount of the first friction plate and the second friction plate is detected.

5 Claims, 12 Drawing Sheets

(51) Int. Cl.
 *F03D 15/10* (2016.01)
 *F03D 80/80* (2016.01)
 F03D 80/70 (2016.01)
 F03D 9/25 (2016.01)

(52) U.S. Cl.
 CPC ........... *F03D 7/0248* (2013.01); *F03D 15/10* (2016.05); *F03D 80/88* (2016.05); *F03D 9/25* (2016.05); *F03D 80/70* (2016.05)

(56) References Cited

U.S. PATENT DOCUMENTS

| | | | |
|---|---|---|---|
| 9,074,635 B2* | 7/2015 | Rasmussen | F03D 7/0204 |
| 9,951,818 B2* | 4/2018 | Winslow | F16B 35/04 |
| 2006/0205554 A1* | 9/2006 | Nohara | F03D 7/0204 |
| | | | 475/179 |
| 2009/0205910 A1* | 8/2009 | Cahill | F16D 66/026 |
| | | | 188/1.11 L |
| 2009/0232652 A1 | 9/2009 | Keller et al. | |
| 2012/0027585 A1 | 2/2012 | Daniels et al. | |

FOREIGN PATENT DOCUMENTS

| | | |
|---|---|---|
| JP | 2008-144853 A | 6/2008 |
| JP | 2011-127551 A | 6/2011 |
| WO | WO 2011/057664 A1 | 5/2011 |

OTHER PUBLICATIONS

Notification of Reasons for Rejection issued in Japanese Patent Application No. 2013-252405 dated Jul. 21, 2017 with full English translation.
International Preliminary Report on Patentability and the Written Opinion of the International Searching Authority as issued in International Patent Application No. PCT/JP2014/081524, dated Jun. 16, 2016.
Extended European Search Report EP Application No. 14868009.3 dated Jul. 21, 2017.
International Search Report as issued in International Patent Application No. PCT/JP2014/081524, dated Feb. 24, 2015.

* cited by examiner

WIND TURBINE DRIVING DEVICE AND WIND TURBINE DRIVING DEVICE UNIT

CROSS-REFERENCE TO RELATED APPLICATIONS

This application is the U.S. National Stage of PCT/JP2014/081524, filed Nov. 28, 2014, which in turn claims priority to Japanese Patent Application No. JP 2013-252405, filed Dec. 5, 2013. The contents of these applications are incorporated herein by reference in their entireties.

TECHNICAL FIELD

The present invention relates to a wind turbine driving device that drives a nacelle provided rotatably relative to a tower of a wind turbine or blades configured to be rockable in a pitch direction with respect to a rotor attached to the nacelle, and relates to a wind turbine driving device unit that includes a plurality of wind turbine driving devices.

BACKGROUND

Conventional wind turbines used as wind power generators include a nacelle installed at the top of a tower and more than one blade. The nacelle is configured to be rotatable on the tower and a generator and the like is disposed thereinside. The blades are installed such that they are rockable in the pitch direction with respect to a rotor which is a main shaft attached to the nacelle. In the wind turbines, a yaw driving device is provided as a wind turbine driving device that drives the nacelle. The yaw driving device drives the nacelle to be rotated relative to the tower so that the nacelle can be turned in accordance with a wind direction. In the wind turbines, a pitch driving device is further provided as a wind turbine driving device that drives the blades. The pitch driving device drives and turns axes of the blades relative to the rotor in the nacelle in order to change pitch angles of the blades.

A wind turbine driving device used as the above-mentioned yaw driving device or the pitch driving device includes an electric motor, a speed reducer, and a pinion. For instance, a geared motor disclosed in Patent Literature 1 may be used as the wind turbine driving device. The speed reducer is coupled to an output shaft of the electric motor in the wind turbine driving device. The pinion is disposed in an output portion coupled to the speed reducer and configured to be meshed with a ring gear that is disposed in the wind turbine. Moreover, a braking mechanism for stopping the output shaft of the electric motor is provided in the wind turbine driving device.

RELEVANT REFERENCES

List of Relevant Patent Literature

Patent Literature 1: Japanese Patent Application Publication No. 2007-120510

SUMMARY

As mentioned above, the wind turbine driving device used as the yaw driving device or the pitch driving device includes the braking mechanism for stopping the output shaft of the electric motor. The braking mechanism includes a friction plate serving as a brake shoe that generates a braking force by friction. In order to tell whether a currently-used friction plate in the wind turbine driving device installed in the wind turbine needs to be replaced or not, it is necessary to know how much the friction plate has been worn and how much the friction plate still remains. In order to check the amount of wear of the friction plate, a worker has to climb up the tower to disassemble the wind turbine driving device. Therefore, it is difficult to easily know the amount of wear of the friction plate in the current wind turbine driving device.

Moreover, there may be malfunctions caused when the friction plate does not work appropriately. More specifically, when friction plates that generate a braking force are stuck to each other or when the friction plates are not displaced to appropriate positions, a malfunction of the friction plates occurs. When such a malfunction of the friction plates occurs, a braking force generated at the braking mechanism is less likely to be released. When an external force works on the output portion of the wind turbine driving device in which the malfunction of the friction plates occurs, the wind turbine driving device, the ring gear of the wind turbine and so on may be broken. The external force may include, for example, a force generated by wind and a force generated by other wind turbine driving device. In order to prevent the breakage of the wind turbine driving device, and the ring gear of the wind turbine, it is desired to easily detect the malfunction of the friction plates.

In view of the above, one object of the invention is to provide a wind turbine driving device and a wind turbine driving device unit in which the amount of wear of the friction plate can be easily checked and a malfunction of the friction plate can be easily detected.

(1) The invention relates to a wind turbine driving device that drives a nacelle provided rotatably relative to a tower of a wind turbine or blades configured to be rockable in a pitch direction with respect to a rotor attached to the nacelle. According to one aspect of the invention in view of the above object, the wind turbine driving device includes an electric motor, a speed reducer coupled to an output shaft of the electric motor, a pinion provided on an output portion that is coupled to the speed reducer and meshing with a ring gear provided on the wind turbine, a first friction plate coupled to the output shaft at an end of the output shaft opposite to an end that faces the speed reducer, a second friction plate configured to contact the first friction plate and configured to generate a braking force on the output shaft to stop rotation of the output shaft by contacting the first friction plate, an elastic member configured to bias the second friction plate toward the first friction plate, electromagnet configured to magnetically attract the second friction plate to bias the second friction plate in a direction in which the second friction plate is separated from the first friction plate, a detection target portion fixed on the second friction plate, and a detector configured to detect a position and a displacement of the detection target portion that is displaced along with the second friction plate. Operation of the second friction plate is detected and checked, and the amount of wear of at least the first friction plate or the second friction plate or both is detected based on a result of detection performed by the detector.

In this configuration, the second friction plate is attracted to the electromagnet by the magnetic force of the electro magnet against an elastic force of elastic members when the electromagnet is in an excited state, and the second friction plate moves away from the first friction plate. In this way, a state where a braking force is not generated is maintained. When the electromagnet is demagnetized, the second friction plate is pressed toward the first friction plate by the elastic force of the elastic member and a braking force is generated therebetween. When the electromagnet is excited again, the braking force is canceled.

Moreover, in the above-described configuration, the wind turbine driving device includes the detection target portion that is fixed on the second friction plate and displaced along with the second friction plate, and the detector that is configured to detect a position and a displacement of the detection target portion. Operation of the second friction plate is detected and checked based on a result of detection performed by the detector. In this way, it is possible to easily detect occurrence of a malfunction in the second friction plate. Moreover, based on the detection result from the detector, the wear amount of at least the first friction plate or the second friction plate is detected. In this way, it is possible to easily know the amount of wear. Therefore, with the simple configuration in which the detection target portion is provided on the second friction plate and the detector is provided to detect a position and a displacement of the detection target portion, it is possible to check the operation of the second friction plate and to detect the wear amount of at least the first friction plate or the second friction plate.

Moreover it is possible to provide a wind turbine driving device in which the wear amount and a malfunction of a friction plate can be easily detected.

(2) In the above wind turbine driving device, it is preferable that the operation of the second friction plate is checked by detecting at least the position or the displacement or both of the second friction plate by the detector when the electromagnet is transitioned from a demagnetized state to an excited state, and the amount of wear of at least the first friction plate or the second friction plate or both is detected by detecting the position of the second friction plate by the detector when the electromagnet is in a demagnetized state.

In this configuration, a malfunction of the second friction plate is easily detected when the electromagnet is transitioned from the demagnetized state to the excited state, and the wear amount of the friction plate is easily detected when the electromagnet is in a demagnetized state.

(3) In the above wind turbine driving device, it is preferable that the operation of the second friction plate is checked by detecting at least the position or the displacement or both of the second friction plate by the detector when the electromagnet is transitioned from a demagnetized state to an excited state, and the amount of wear of at least the first friction plate or the second friction plate or both is detected by detecting the displacement of the second friction plate by the detector when the electromagnet is transitioned from a demagnetized state to an excited state or when the electromagnet is transitioned from an excited state to a demagnetized state.

In this configuration, a malfunction of the friction plate is easily detected when the electromagnet is transitioned from a demagnetized state to an excited state, and the wear amount of the friction plate is easily detected when the electromagnet is transitioned from a demagnetized state to an excited state or when the electromagnet is transitioned from an excited state to a demagnetized state.

(4) According to another aspect of the invention, a wind turbine driving device unit includes a plurality of the above-described wind turbine driving devices. The wind turbine driving device unit according the aspect of the invention includes a control unit controlling operations of the plurality of wind turbine driving devices. The plurality of wind turbine driving devices is disposed to correspond to the ring gear, the detectors in the plurality of wind turbine driving devices are coupled to the control unit to output detection results to the control unit, the control unit is configured to check the operation of the second friction plate based on the position and the displacement of the second friction plate detected by the detector when the electromagnet is transitioned from a demagnetized state to an excited state. The control unit is further configured to stop operations of the electric motors in all the plurality of wind turbine driving devices in a case where a zero-displacement state or an insufficient displacement state of the second friction plate is detected in any of the plurality of wind turbine driving devices when the electromagnet is transitioned from an demagnetized state to an excited state. The position of the second friction plate is unchanged in the zero-displacement state when the electromagnet is transitioned from the demagnetized state to the excited state, and the second friction plate is attracted by a magnetic force of the electromagnet but underreaches a predetermined position in the insufficient displacement state when the electromagnet is transitioned from the demagnetized state to the excited state.

This arrangement produces the same effect as the wind turbine driving device according to the above aspect of the invention. More specifically, it is possible to provide a wind turbine driving device unit in which the wear amount and a malfunction of a friction plate can be easily detected.

In the configuration, in the plurality of the wind turbine driving device, whether the zero-displacement state or the insufficient displacement state occurs or not is determined when the electromagnet is transitioned from the demagnetized state to the excited state. When the zero-displacement state or the insufficient displacement state is detected in any of the wind turbine driving devices, the electric motors in all the wind turbine driving devices are stopped. In other words, not only in the wind turbine driving device in which the zero-displacement state or the insufficient displacement state occurs but also in all the wind turbine driving devices, operation of the electric motors are stopped. Therefore when a malfunction of the second friction plate occurs in any of the wind turbine driving devices, it is possible to prevent external forces from the other wind turbine driving devices from working concentratedly on the output portion of the wind turbine driving device in which the malfunction of the second friction plate occurs. In this way, it is possible to prevent breakage of the ring gear and the like in the wind turbine driving device or the wind turbine.

(5) In the above wind turbine driving device unit, it is preferable that the control unit demagnetizes the electromagnets in all the plurality of the wind turbine driving devices when the control unit stops the operations of the electric motors in all the plurality of wind turbine driving devices.

In this configuration, if the zero-displacement state or the insufficient displacement state of the second friction plate is detected in any of the wind turbine driving devices when the electromagnet transitions from a demagnetized state to an excited state, the electric motors in all the wind turbine driving devices are stopped and the electromagnets are demagnetized. In other words, not only in the wind turbine driving device in which the zero-displacement state or the insufficient displacement state occurs but also in all the wind turbine driving devices, a braking force is generated. Therefore when a malfunction of the second friction plate occurs in any of the wind turbine driving devices, it is possible to prevent an external force of wind from working concentratedly on the output portion of the wind turbine driving device in which the malfunction of the second friction plate occurs.

In this way, it is possible to reliably prevent breakage of the ring gear and the like in the wind turbine driving device or the wind turbine.

(6) According to another aspect of the invention, a wind turbine driving device unit includes a plurality of the above-described wind turbine driving devices. The wind turbine driving device unit according another aspect of the invention includes a control unit controlling operations of the plurality of wind turbine driving devices. The plurality of wind turbine driving devices is disposed to correspond to the ring gear, the detectors in the plurality of wind turbine driving devices are coupled to the control unit to output detection results to the control unit, the control unit checks the operation of the second friction plate and detects the amount of wear of at least the first friction plate or the second friction plate or both based on the result of the detection by the detector. When the wear amount is equal to or larger than a predetermined value in any of the wind turbine driving devices, the control unit transmits a replacement-required command to an upper-level control device that controls operation of the wind turbine and is coupled to the control unit. The replacement-required command notifies that replacement of the first friction plate and the second friction plate in the wind turbine driving device in which the wear amount is equal to or more than the predetermined value is required.

This arrangement produces the same effect as the wind turbine driving device according to the above aspect of the invention. More specifically, it is possible to provide a wind turbine driving device unit in which the wear amount and a malfunction of a friction plate can be easily detected.

In the above-described configuration, when the wear amount of the friction plate in any of the wind turbine driving devices is equal to or larger than a predetermined value, the replacement-required command is is transmitted to the upper-level control device. The replacement-required command notifies that replacement of the first and second friction plates in the wind turbine driving device in which the wear amount of the friction plate is equal to or more than the predetermined value is required. Therefore, the upper-level control device can know the wind turbine driving device in which the replacement of the friction plates is required based on the replacement-required command transmitted by the control unit.

According to the aspects of the invention, it is possible to provide a wind turbine driving device and a wind turbine driving device unit in which the amount of wear can be easily checked and a malfunction of a friction plate can be easily detected.

DESCRIPTION OF THE PREFERRED EMBODIMENTS

The embodiments of the present invention will now be described with reference to the drawings. The wind turbine driving device according to an embodiment of the invention relates to a wind turbine driving device that drives a nacelle provided rotatably with respect to a tower of the wind turbine or blades that is provided rockably in a pitch direction with respect to a rotor attached to the nacelle, and relates to a wind turbine driving device unit that includes such wind turbine driving devices. The wind turbine driving device according to the embodiment may be used as a yaw driving device that yaw-drives a nacelle to rotate the nacelle relative to a tower of the wind turbine. The wind turbine driving device according to the embodiment may also be used as a pitch driving device that pitch-drives shaft portions of blades to rotate the blades relative to the rotor on the nacelle side.

Wind Turbine

Figure 1:
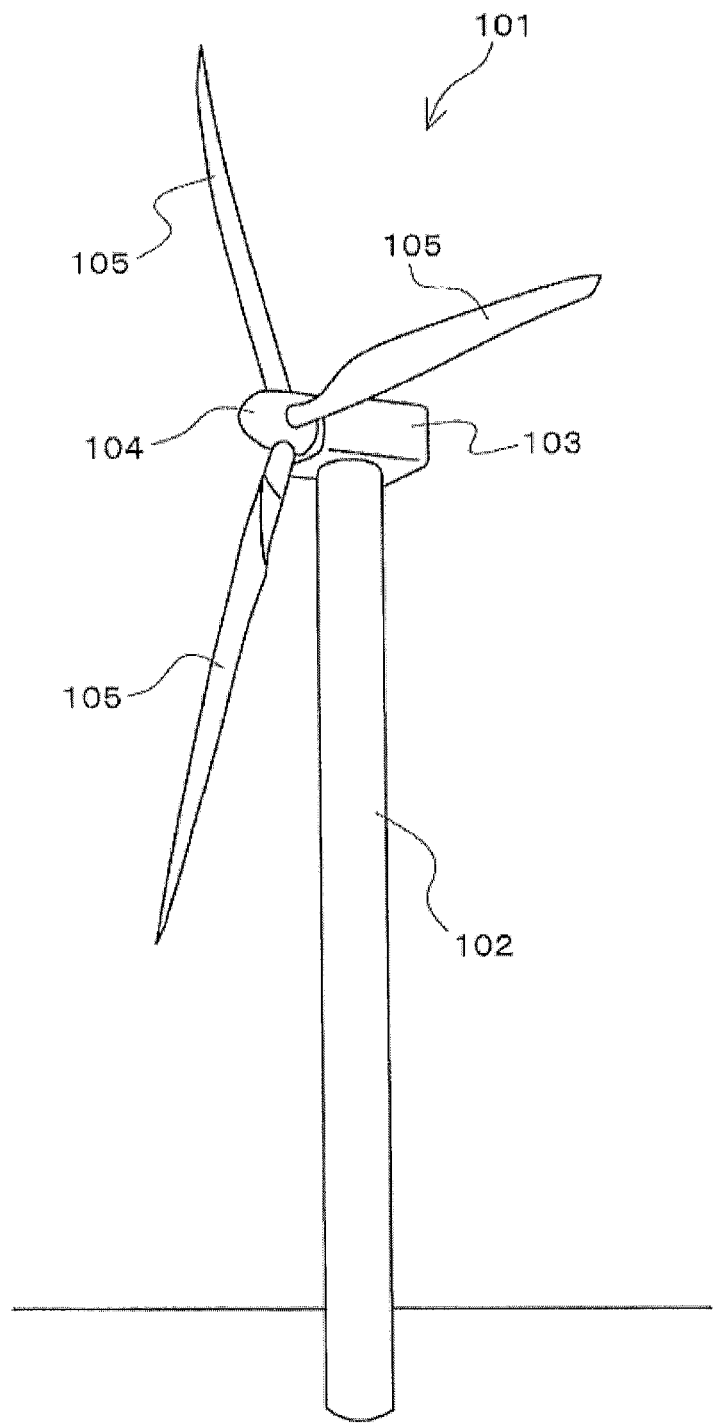
FIG. 1 is a perspective view of a wind turbine to which a wind turbine driving device and a wind turbine driving device unit according to one embodiment of the invention are applied.

FIG. 1 is a perspective view of a wind turbine 101 to which a wind turbine driving device 1 and a wind turbine driving device unit 10 according to one embodiment of the invention are applied. As shown in FIG. 1, the wind turbine 101 includes, for example, a tower 102, a nacelle 103, a rotor 104 that forms a main shaft portion, blades 105, and so on.

The tower 102 is installed such that it extends vertically upward from the ground. The nacelle 103 is rotatably installed on the top of the tower 102. The nacelle 103 is installed such that it is rotated (pivots) in a horizontal plane by the wind turbine driving devices 1, which will be described later. A power transmission shaft, an electricity generator and the like are disposed inside the nacelle 103. The rotor 104 is coupled to the power transmission shaft and is configured to be rotatable relative to the nacelle 103. More than one blade 105 (three in this embodiment) is attached to the rotor 104 and they extend radially from rotor 104 at equiangular intervals. Note that the blades 105 are installed on a shaft portion provided in the rotor 104 so as to rock around the axis of the shaft portion and relative to the rotor 104 in a pitch direction. The blades 105 are rotatably driven by a wind turbine driving device that is configured same as the hereunder-describe wind turbine driving device 1 but serves as a pitch driving device. A pitch angle of the blade 105 is changed by rotatably driving the blade by the wind turbine driving device.

Figure 2:
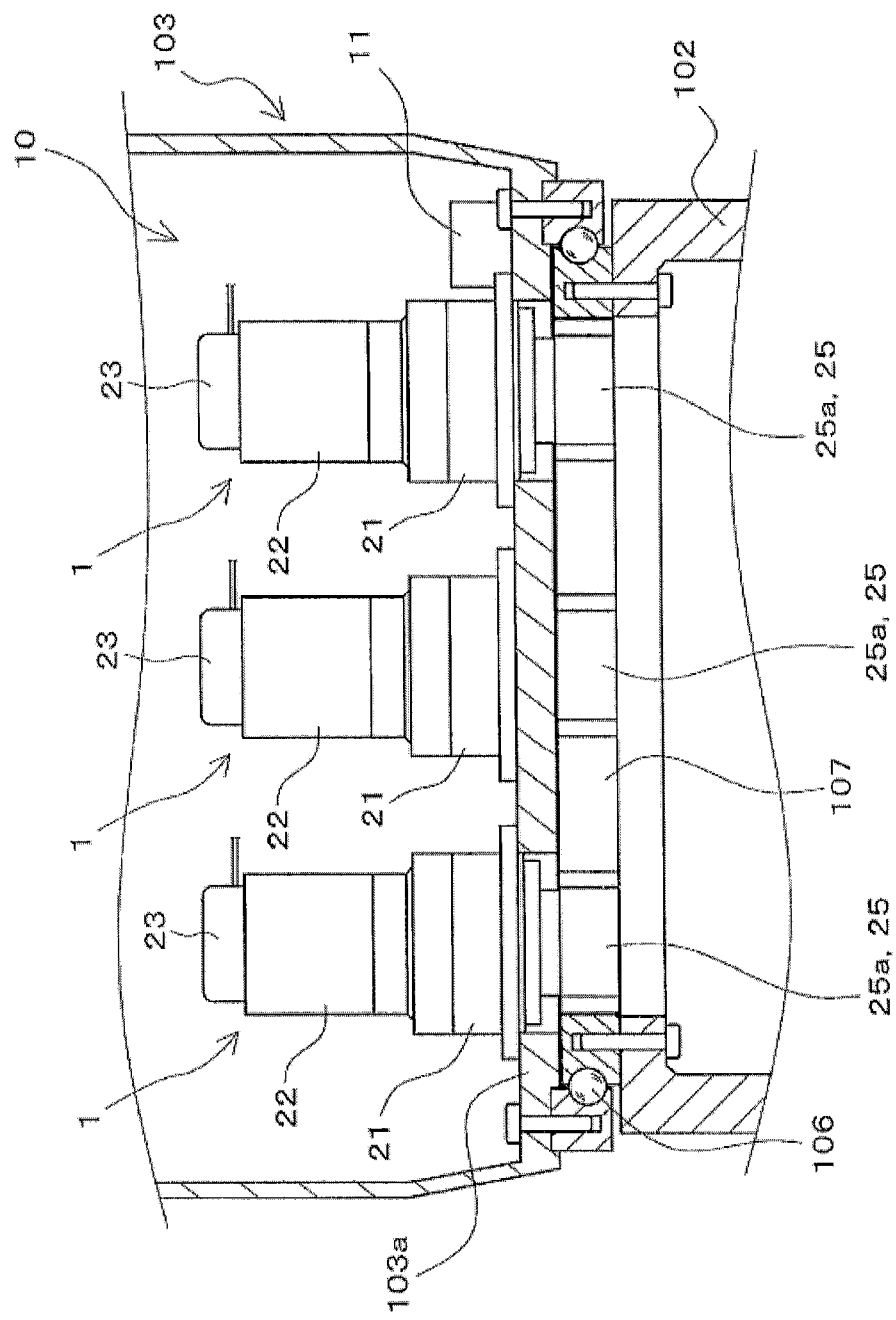
FIG. 2 is an enlarged sectional view of a portion of a nacelle that is installed rotatably with respect to a tower of the wind turbine of FIG. 1 to illustrate a wind turbine driving device and a wind turbine driving device unit according to one embodiment of the invention.

FIG. 2 is an enlarged sectional view of a portion of the nacelle 103 that is rotatably installed on the tower 102 of the wind turbine 101. FIG. 2 does not show a sectional view but an outside view of the wind turbine driving device 1. The nacelle 103 is configured to be rotatable relative to the top portion of the tower 102 via a bearing 106 interposed between a bottom portion 103a of the nacelle and the tower 102. A ring gear 107 having internal teeth on its inner circumference is fixed to the top portion of the tower 102. In FIG. 2, the internal teeth of the ring gear 107 are not shown. Note that the teeth of the ring gear 107 are not necessarily provided on the inner circumference of the ring gear 107 and may be alternatively provided on the outer circumference thereof.

More than one wind turbine driving device 1 is provided inside the nacelle 103. A body 21 of each wind turbine driving device 1 is fixed on the bottom portion 103a. An electric motor 22 is respectively fixed to the body 21. An output portion 25 of the wind turbine driving device 1 includes a pinion 25a that protrudes out from an opening formed in the bottom portion 103a of the nacelle 103 to be meshed with a ring gear 107. Note that the pinion 25a is schematically illustrated in FIG. 2. The wind turbine driving devices 1 are disposed at multiple (e.g., four) locations along the inner circumferential direction of the ring gear 107. By arranging the wind turbine driving devices 1 as described above, the pinions 25 are each configured to mesh with the ring gear 107 fixed to the tower 102. The electric motors 22 are each fixed to the nacelle 103 that is rotatable relative to the tower 102. In other words, the electric motors 22 are fixed to the nacelle 103 with the bodies 21 interposed therebetween.

Structure of Wind Turbine Driving Device

Figure 3:
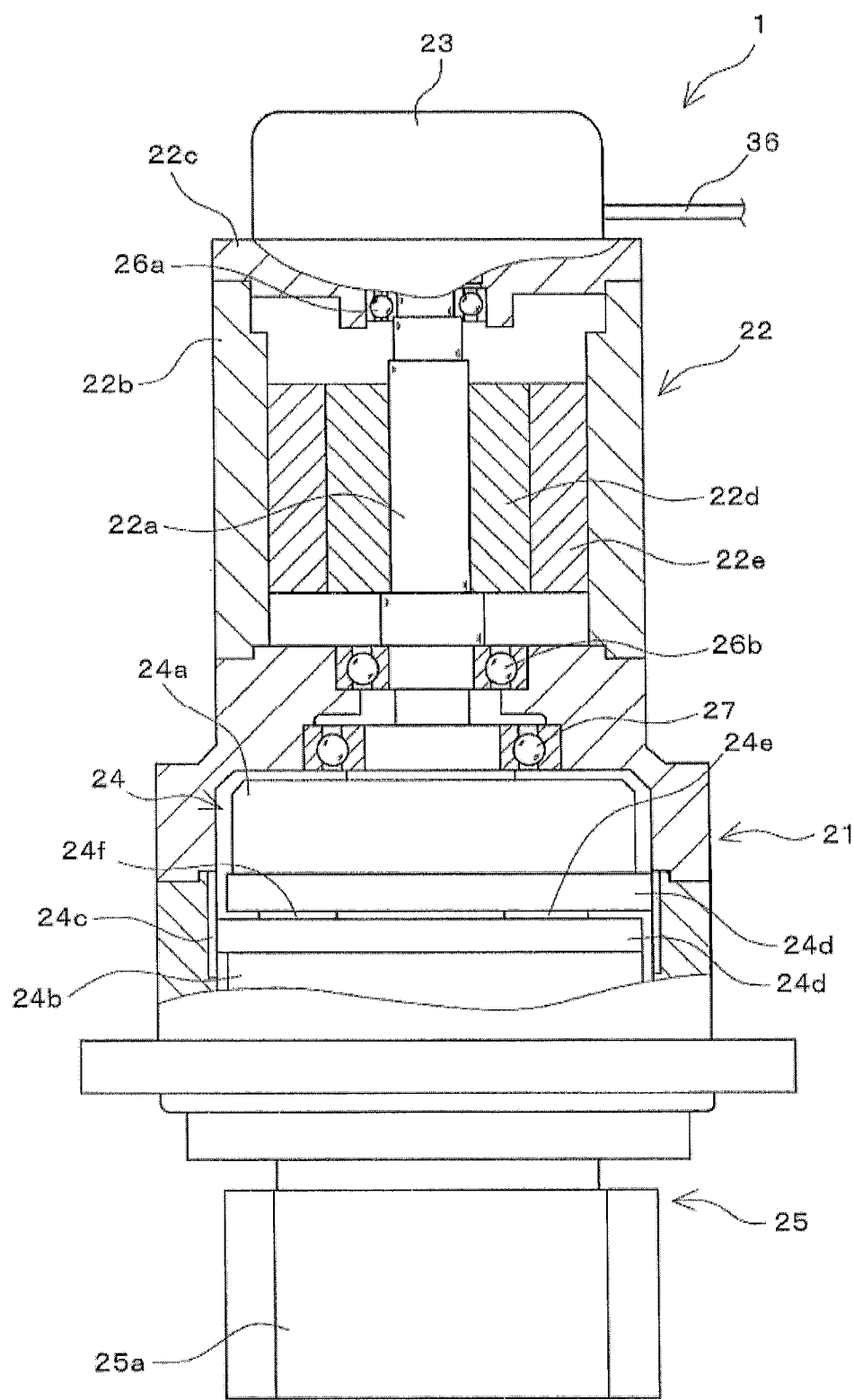
FIG. 3 is a front elevation of the wind turbine driving device of FIG. 2 including a cutaway thereof.

The wind turbine driving device 1 and the wind turbine driving device unit 10 according to one embodiment of the invention will be now described in detail. FIG. 3 is a front elevation of the wind turbine driving device 1 including a cutaway thereof. The wind turbine driving devices 1 shown in FIGS. 2 and 3 are provided as yaw driving devices that cause the nacelle 103 to rotate relative to the tower 102 as described above. The wind turbine driving device 1 may include the body 21, the electric motor 22, a braking mechanism 23, a speed reducer 24, an output portion 25 and the like.

The body 21 of the wind turbine driving device 1 may have a tubular structure. The speed reducer 24 may be housed in the body 21. The electric motor 22 may be fixed on the upper end of the body 21. Inside the body 21, the speed reducer 24 may be coupled to an output shaft 22a of the electric motor 22.

The electric motor 22 may include the output shaft 22a, a cylindrical case 22b, a cover 22c that covers one end of the case 22b, a rotor 22d, a stator 22e and the like. The other end of the case 22b may be fixed on the body 21. A through hole through which the output shaft 22a goes through may be formed in the cover 22c. One end of the output shaft 22a goes through the cover 22c and reaches in the brake mechanism 23 and the other end reaches in the body 21. The output shaft 22a may be rotatably supported by the cover 22c via a bearing 26a and also rotatably supported by the body 21 through a bearing 26b. The rotor 22d may include permanent magnet and may be attached to the outer periphery of the output shaft 22a. The stator 22e may include a coil and be attached to the inner periphery of the case 22b. When electric current runs through the coil of the stator 22e from an electric power supply (not shown) in response to a command from a control unit 11 which will be described later, the rotor 22a and the output shaft 22a are driven to rotate.

The speed reducer 24 may be coupled to the output shaft 22a of the electric motor 22 and reduce the revolutions of the output shaft 22a to transmit the deceleration to the output portion 25. The speed reducer 24 may be an eccentric speed reducer that includes, for example, an end carrier 24a, a base carrier 24b, an internal tooth 24c arranged along the inner periphery of the body 21, a plurality of external gears 24d, more than one crankshaft 24e (only one crankshaft is shown in FIG. 3) and so on. The end carrier 24a may be rotatably supported by the body 21 via a bearing 27. The base carrier 24b may be coupled to the end carrier 24a through more than one pole 24f (only one pole is shown in FIG. 3) that penetrates the external gears 24b. The base carrier 24b may be rotatably supported by the body 21. The external gears 24d have external tooth meshing with the internal tooth 24c. The crankshaft 24e may have an eccentric portion, each end of the crankshaft 24e is rotatably supported by the end carrier 24a and the base carrier 24b respectively, and it penetrates the external gears 24d. The crankshaft 24e is rotated by the rotation of the output shaft 22a of the electric motor 22 and revolves to make the external gears 24d rock and rotate. The end carrier 24a and the base carrier 24b are rotated by the revolution of the crankshaft 24e and the output portion 25 fixed on the base carrier 24b is rotated.

The eccentric speed reducer 24 is merely an example and the speed reducer 24 may be formed as any type of reducer other than the eccentric speed reducer. For instance, the speed reducer 24 may be formed from a planetary gear mechanism. Alternatively, the speed reducer 24 may be formed from a spur gear mechanism. Alternatively, the speed reducer 24 may be formed from any combination of an eccentric speed gear, a planetary gear mechanism, and a spur gear mechanism.

At the lower end of the body 21, the output portion 25 may be disposed such that it projects out from the body 21. The output portion 25 may be coupled to the speed reducer 24 at the end opposite to the end facing the output shaft 22a of the electric motor 22. The pinion 25a may be provided at the other end of the output portion 25. The pinion 25a may be disposed to mesh with the ring gear 107 provided on the wind turbine 101.

In the above-described wind turbine driving device 1, the electric motor 22 operates based on a command from the hereunder-described control unit 11 to generate a rotational driving force. The wind turbine driving device 1 transmits the rotational driving force generated by the electric motor 22 to the speed reducer 24 through the output shaft 22a. The rotational driving force input through the output shaft 22a is reduced by the speed reducer 24, and the reduced driving force is transmitted to the output portion 25 and then output from the pinion 25a. In this manner, the wind turbine driving device 1 rotates the pinion 25a that meshes with the ring gear 107 and the nacelle 103 is rotated relative to the tower 102.

Structure of Wind Turbine Driving Device Unit

The wind turbine driving device unit 10 according to the embodiment illustrated in FIG. 2 may include a plurality of the wind turbine driving devices 1 that serve as yaw driving devices. For instance, the wind turbine driving device unit 10 includes four wind turbine driving devices 1. The wind turbine driving devices 1 in the wind turbine driving device unit 10 may be provided for the single ring gear 107. The wind turbine driving device unit 10 may further include a control unit 11 that controls the plurality of wind turbine driving devices 1.

The control unit 11 may be formed of a microcontroller or a microcomputer that includes, for example, a processor such as a central processing unit (CPU), memory, a timer, an input/output interface and the like. The control unit 11 may be coupled to each of the wind turbine driving devices 1 to allow signals to be transmitted and received to/from the wind turbine driving devices 1. The control unit 11 may control the electric motor 22 and the braking mechanism 23 in each wind turbine driving device 1. Operation of the control unit 11 to control the wind turbine driving devices 1 will be described in later. In this embodiment, the control unit 11 is disposed in the nacelle 103.

Braking Mechanism

Figure 4:
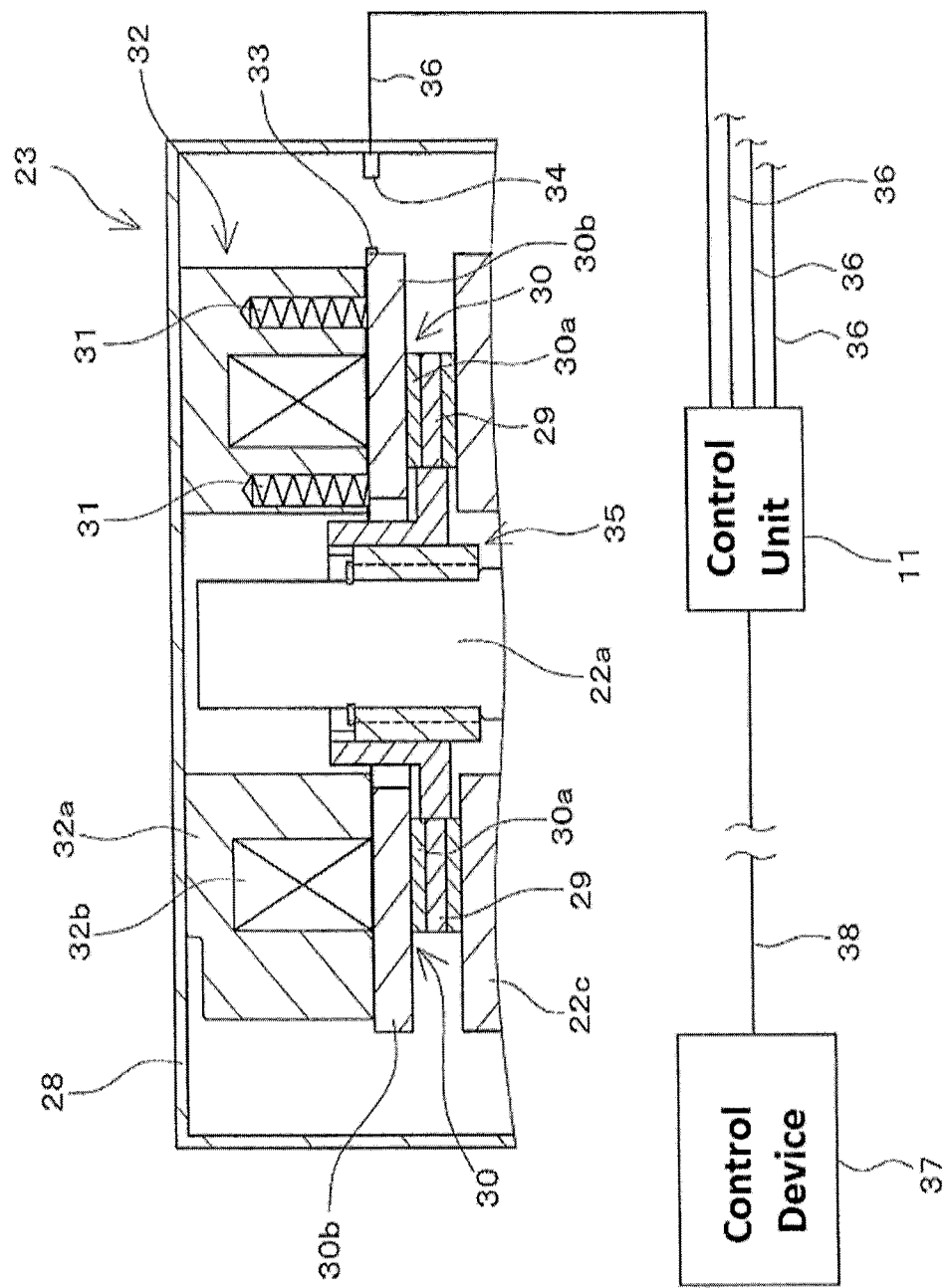
FIG. 4 is a sectional view schematically illustrating a control unit in the wind turbine driving device unit and a braking mechanism of the wind turbine driving device of FIG. 2.
Figure 5:
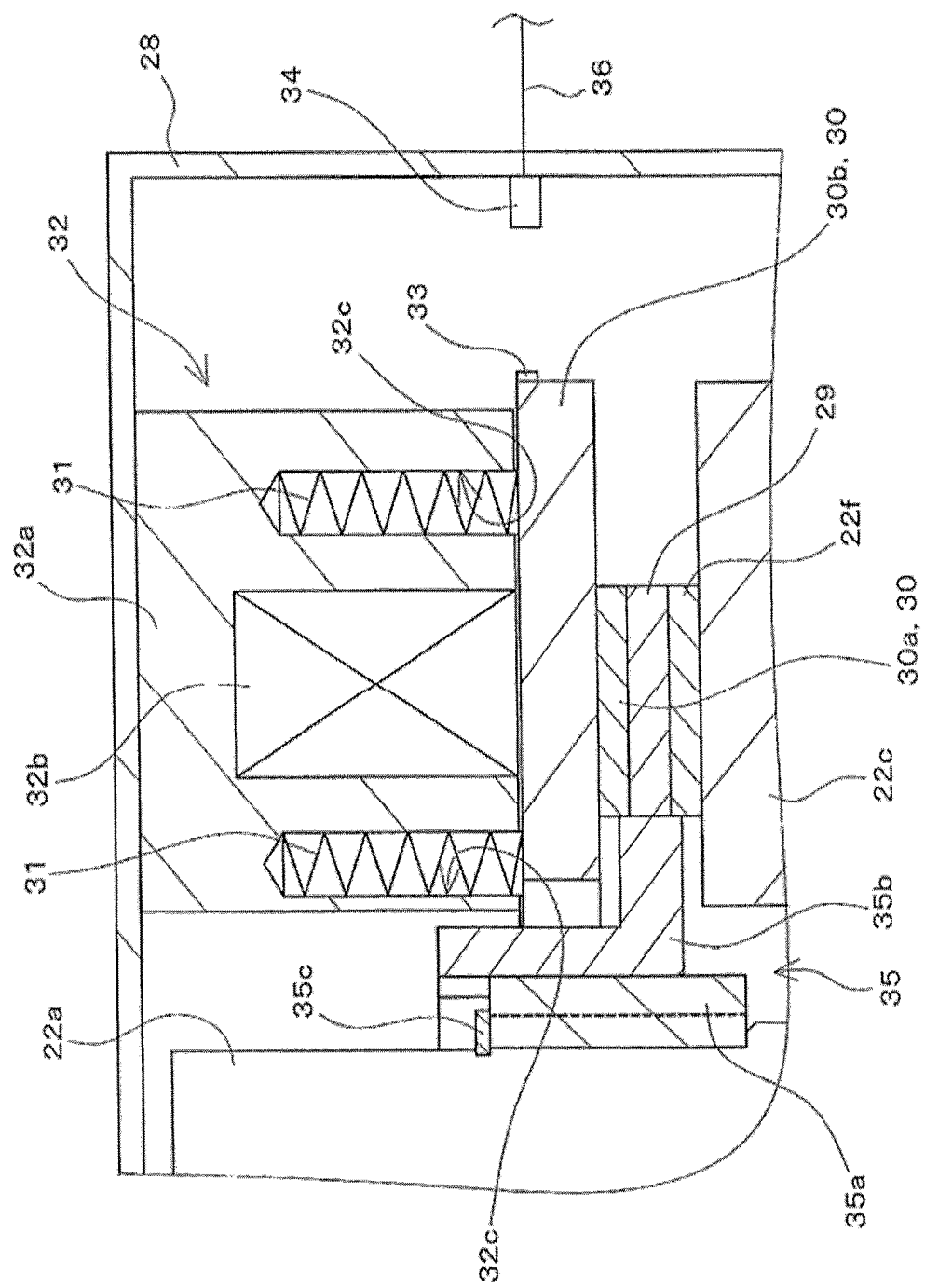
FIG. 5 is a partially-enlarged sectional view of the braking mechanism of FIG. 4.

The braking mechanism 23 in the wind turbine driving device 1 will be now described. FIG. 4 schematically illustrates the control unit 11 in the wind turbine driving device unit 10 and a sectional view of the braking mechanism 23. FIG. 5 is a partially-enlarged sectional view of the braking mechanism 23 of FIG. 4. The braking mechanism 23 shown in FIGS. 4 and 5 is configured to control the rotation of the output shaft 22a of the electric motor 22 and to release braking on the output shaft 22a based on a command from the control unit 11. When a brake works on the rotation of the output shaft 22a, the wind turbine driving device 1 stops its operation. Whereas when a brake on the output shaft 22a is lifted, the wind turbine driving device 1 is able to operate to rotationally drive the nacelle 103. The braking mechanism 23 will be now described in detail.

The braking mechanism 23 may be attached on the upper end of the electric motor 22. More specifically, the braking mechanism 23 is attached on the cover 22c at one end of the electric motor 22 further from the body 21. The braking mechanism 23 may include a housing 28, a first friction plate 29, a second friction plate 30, an elastic member 31, electromagnet 32, a detection target portion 33, a detector 34, a first friction plate connector 35, and the like.

The housing 28 may be configured to house the first friction plate 29, the second friction plate 30, the elastic member 31, the electromagnet 32, the detection target portion 33, the detector 34, the first friction plate connector 35, and the like. The housing 28 may be fixed on the cover 22c of the electric motor 22.

The first friction plate 29 may be formed of a sintered metal in a ring-plate shape. The upper end of the output shaft 22a of the electric motor 22 goes through a through hole formed in the central region of the first friction plate 29. The first friction plate 29 may be coupled to the upper end of the output shaft 22a via the first friction plate connector 35, which is the end opposite to the one facing the speed reducer 24.

The first friction plate connector 35 may include a spline shaft 35a, a slide shaft 35b, and the like. The spline shaft 35a may be a shaft member that has a spline tooth on its outer periphery and a through hole extending in the axial direction thereinside. The spline shaft 35a is fixed to the outer periphery of the upper end of the output shaft 22a through, for instance, key coupling via a key member (not shown) and engagement with a stoppering 35c.

The slide shaft 35b may have a tubular portion where a spline groove is formed in the inner periphery and a flange portion that extends from one end of the tubular portion in a radial direction and spreads in a circumferential direction. The spline groove formed in the slide shaft 35b is configured to engage with the spline tooth of the spline shaft 35a to allow the slide shaft 35b to slide in the axial direction. In this manner, the slide shaft 35b is arranged to be slidable relative to the spline shaft 35a in the axial direction. The first friction plate connector 35 may include a spring mechanism (not shown) for placing the slide shaft 35b at a predetermined position in the axial direction with respect to the spline shaft 35a. An inner periphery of the first friction plate 29 may be fixed on the edge of the outer periphery of the flange portion of the slide shaft 35b. In this way, the first friction plate 29 is coupled integrally with the slide shaft 35b.

According to the above-described configuration, when the output shaft 22a rotates in the braking mechanism 23, the spline shaft 35a, the slide shaft 35b, and the first friction plate 29 rotate together with the output shaft 22a. When the hereunder-described electromagnet 32 is excited, the slide shaft 35b and the first friction plate 29 that are retained slidably in the axial direction relative to the output shaft 22a and the spline shaft 35a are situated at a predetermined position in the axial direction of the spline shaft 35a with a retaining force from the spring mechanism. In this state, the first friction plate 29 may be situated at a distance from hereunder-described second friction plate 30 and motor-side friction plate 22f.

The second friction plate 30 is configured to contact the first friction plate 29. By contacting the first friction plate 29, the second friction plate 30 generates a braking force on the output shaft 22a to stop the rotation of the output shaft 22a. The second friction plate 30 may include a contact portion 30a and an armature portion 30b.

The armature portion 30b may be formed of a magnetic metal in a ring-plate shape. The armature portion 30b is held on one end of the electromagnet 32 such that the armature portion 30b is slidable relative to the end surface of the electromagnet 32 in parallel to the axial direction of the output shaft 22a. Note that a mechanism with which the armature portion 30b is slidably held at the end of the electromagnet 32 is not shown. At the central region of a through hole formed at the center of the armature portion 30b, the upper end portion of the output shaft 22a, the spline shaft 35a, and the tube portion of the slide shaft 35b are situated to penetrate the through hole of the armature portion 20b.

The contact portion 30a may be formed of a sintered metal in a ring-plate shape. The contact portion 30a may be fixed on the armature portion 30b and also configured to contact the first friction plate 29. More specifically, the end surface of the contact portion 30a further from the first friction plate 29 is fixed on the armature portion 30b. In the embodiment, the end surface of the contact portion 30a facing the first friction plate 29 may have substantially the same area as that of the first friction plate 29.

In the embodiment, the motor-side friction plate 22f may be provided on the end surface of the cover 22c of the electric motor 22 facing the first friction plate 29. The motor-side friction plate 22f may be formed of a sintered metal in a ring-plate shape. The motor-side friction plate 22f is disposed on the cover 22c such that it contacts the first friction plate 29. In the embodiment, the end surface of the first friction plate 29 facing the motor-side friction plate 22f may have substantially the same area as that of the motor-side friction plate 22f.

The elastic member 31 is a member that biases the second friction plate 30 toward the first friction plate 29. The elastic member 31 may be retained by an electromagnetic body 32a of the electromagnet 32 which will be described later. The elastic member 31 biases the second friction plate 30 in the direction from the electromagnet 32 side to the first friction plate 29. In the embodiment, the elastic member 31 may be a coil spring. More than one elastic member 31 may be provided. One end of each elastic member 31 is held by the electromagnetic body 32a and the other end biases the armature portion 30b of the second friction plate 30. Although the elastic members 31 are coil springs in the embodiment, this is merely an example. Any spring members other than the coil springs may be used as the elastic members.

In the embodiment, more than one elastic member 31 is provided as mentioned above. The elastic members 31 are provided on the electromagnetic body 32a circumferentially around the output shaft 22a at equal angle intervals. Moreover the elastic members 31 are arranged in two concentric circles on the electromagnetic body 32a circumferentially around the output shaft 22a. The inner circle of the elastic members 31 of the two concentric circles is situated on the inner side of a coil 32b of the electromagnet 32. Whereas the outer circle of the elastic members 31 of the two concentric circles of the elastic members 31 is situated on the outer side of a coil 32b of the electromagnet 32. The arrangement of the elastic members 31 described above is merely an example and the elastic members 31 may be arranged in different configurations.

The electromagnet 32 magnetically attracts the second friction plate 30 to bias the second friction plate 30 in the direction in which the second friction plate 30 is separated from the first friction plate 29. The electromagnet 32 may include the electromagnetic body 32a, the coil 32b and the like.

The electromagnetic body 32a may have a cylindrical shape that has a through hole formed at its center region. The end of the output shaft 22a is disposed in the through hole formed at the center region of the electromagnetic body 32a. The end of the electromagnetic body 32a further from the second friction plate 30 may be fixed on the housing 28. A plurality of elastic-member retaining holes 32c that open toward the second friction plate 30 are formed in the electromagnetic body 32a to house and retain the elastic members 31 therein.

The coils 32b may be disposed inside the electromagnetic body 32a and arranged along the circumferential direction of the electromagnetic body 32a. Supplying and shutting off of electric current to the coil 32b may be performed based on a command from the control unit 11. When a brake on the output shaft 22a by the braking mechanism 23 is to be released, electric current is supplied to the coil 32b to energize the electromagnet 32 based on a command from the control unit 11. When the electromagnet 32 is excited, the armature portion 30b of the second friction plate 30 is attracted to the coil 32b by magnetic force generated by the electromagnet 32.

As described above, when the electromagnet 32 is excited, the second friction plate 30 is biased against the elastic force (spring force) of the elastic members 31 and attracted to the electromagnet 32. The contact portion 30a of the second friction plate 30 subsequently moves away from the first friction plate 29 and the brake on the output shaft 22a is released. Under the state where the electromagnet 32 is excited and the brake on the output shaft 22a is released, the armature portion 30b of the second friction plate 30 contacts the electromagnetic body 32a.

When the braking mechanism 23 puts a brake on the output shaft 22a, electric current supplied to the coil 32b is cutout based on a command from the control unit 11 and the electromagnet 32 is demagnetized. When the electromagnet 32 is demagnetized, the second friction plate 30 is biased toward the first friction plate 29 by an elastic force of the plurality of elastic members 31. Consequently the contact portion 30a of the second friction plate 30 contacts the first friction plate 29, and a friction force generated between the second friction plate 30 and the first friction plate 29 puts a brake on rotation of the output shaft 22a. FIGS. 4 and 5 illustrate the state where the electromagnet 32 is demagnetized and the rotation of the output shaft 22a is braked.

When the electromagnet 32 is demagnetized and the output shaft 22a is braked, the first friction plate 29 also contacts the motor-side friction plate 22f due to the bias force from the second friction plate 30. More specifically, when the electromagnet 32 is in a demagnetized state, the first friction plate 29 is sandwiched between the second friction plate 30 and the motor-side friction plate 22f due to the bias force exerted by the plurality of elastic members 31. Consequently the friction force generated between the second friction plate 30 and the first friction plate 29 and the friction force generated between the first friction plate 29 and the motor-side friction plate 22f brakes the rotation of the output shaft 22a.

The detection target portion 33 may be an element fixed on the second friction plate 30 for detecting the position and displacement of the second friction plate 30 in a direction parallel to the axial direction of the output shaft 22a by the detector 34 which will be described later in detail. In the embodiment, the detection target portion 33 may be provided as permanent magnet. The detection target portion 33 is fixed on the armature portion 30b of the second friction plate 30. In the embodiment, the detection target portion 33 may be fixed on the outer edge of the armature portion 30b closer to the electromagnet 32. Therefore by detecting the position of the detection target portion 33 by the detector 34, a position of a portion of the second friction plate 30 where may contact the electromagnet 32 in a direction parallel to the output shaft 22a is detected.

The detector 34 may be provided as a sensor that detects a position and displacement of the detection target portion 33 that is displaced along with the second friction plate 30. More specifically, the detector 34 is configured to detect the position and displacement of the detection target portion 33 in the direction parallel to the axial direction of the output shaft 22a in order to detect the position and displacement of the second friction plate 30 in the direction parallel to the axial direction of the output shaft 22a.

In the embodiment, the detector 34 may be provided as a magnetic sensor. The detector 34 may be fixed on an inner wall of the housing 28 and configured as a sensor that measures an intensity of a magnetic field generated by the detection target portion 33 which is permanent magnet. The detector 34 detects the position and displacement of the detection target portion 33 by measuring the intensity and direction of the magnetic field generated by the detection target portion 33. In the embodiment, the detector 34 may be fixed on the housing 28 at a position corresponding to the end surface of the electromagnetic body 32a that contacts the armature portion 30b in the direction parallel to the axial direction of the output shaft 22a.

The detector 34 may be coupled to the control unit 11 through a communication cable 36. The detector 34 is therefore configured to output a detection result to the control unit 11. The detector 34 in each of the wind turbine driving devices 1 is configured to output a detection result to the control unit 11 through the communication cable 36. More specifically, after the position and displacement of the second friction plate 30 are detected by the detector 34 in each wind turbine driving device 1, the result of the detection performed by the detector 34 is respectively transmitted to the control unit 11, and the control unit 11 receives the results from the detectors 34. Each detector 34 may also be configured to receive a command signal from the control unit 11 through the communication cable 36.

The control unit 11 may be configured to check operation of the second friction plate 30 and the amount of wear of at least the first friction plate 29 and/or the second friction plate 30 based on the detection result of the detector 34 in each wind turbine driving device 1. Therefore each wind turbine driving device 1 is configured such that operation of the second friction plate 30 is detected and checked, the amount of wear of at least the first friction plate 29 and/or the second friction plate 30 is detected based on the result of detection performed by the detector 34.

In the embodiment, the control unit 11 may be configured to check operation of the second friction plate 30 based on the position of the second friction plate 30 detected by the detector 34 when the electromagnet 32 is transitioned from a demagnetized state to an excited state. Therefore the wind turbine driving device 1 is configured such that the operation of the second friction plate 30 is checked by detecting the position of the second friction plate 30 using the detector 34 when the electromagnet 32 is transitioned from a demagnetized state to an excited state.

Moreover, in the embodiment, the control unit 11 may be configured to detect the amount of wear of at least the first friction plate 29 or the second friction plate 30 or both based on the position of the second friction plate 30 detected by the detector 34 when the electromagnet 32 is in a demagnetized state. Therefore the wind turbine driving device 1 may be configured such that the amount of wear of at least the first friction plate 29 or the second friction plate 30 or both is detected by detecting the position of the second friction plate 30 using the detector 34 when the electromagnet 32 is in a demagnetized state.

Second Friction Plate Operation Check Process and Wear Amount Detection Process

Operations of the wind turbine driving device 1 and the wind turbine driving device unit 10 will be now described. The wind turbine driving device 1 and the wind turbine driving device unit 10 operate based on control performed by the control unit 11. The control unit 11 may be coupled via a communication cable 38 to an upper-level control device 37 that controls operation of the wind turbine 101 as illustrated in FIG. 4. The control unit 11 may control the wind turbine driving devices 1 based on commands from the control device 37.

More specifically, each wind turbine driving device 1 operates such that the electric motor 22 in the wind turbine driving device 1 operates based on a command from the control unit 11 to rotationally drive the nacelle 103. Moreover, operation of each electric motor 22 may be stopped based on a command from the control unit 11, and each brake mechanism 23 may put a brake on the corresponding output shaft 22*a*. A brake on each output shaft 22*a* by the corresponding braking mechanism 23 may be released based on a command from the control unit 11. Furthermore, the control unit 11 may perform a second friction plate operation check process and a wear amount detection process based on the result of detection performed by each detector 34. The second friction plate operation check process and the wear amount detection process performed in the wind turbine driving device 1 and the wind turbine driving device unit 10 will be now described in detail.

Figure 6:
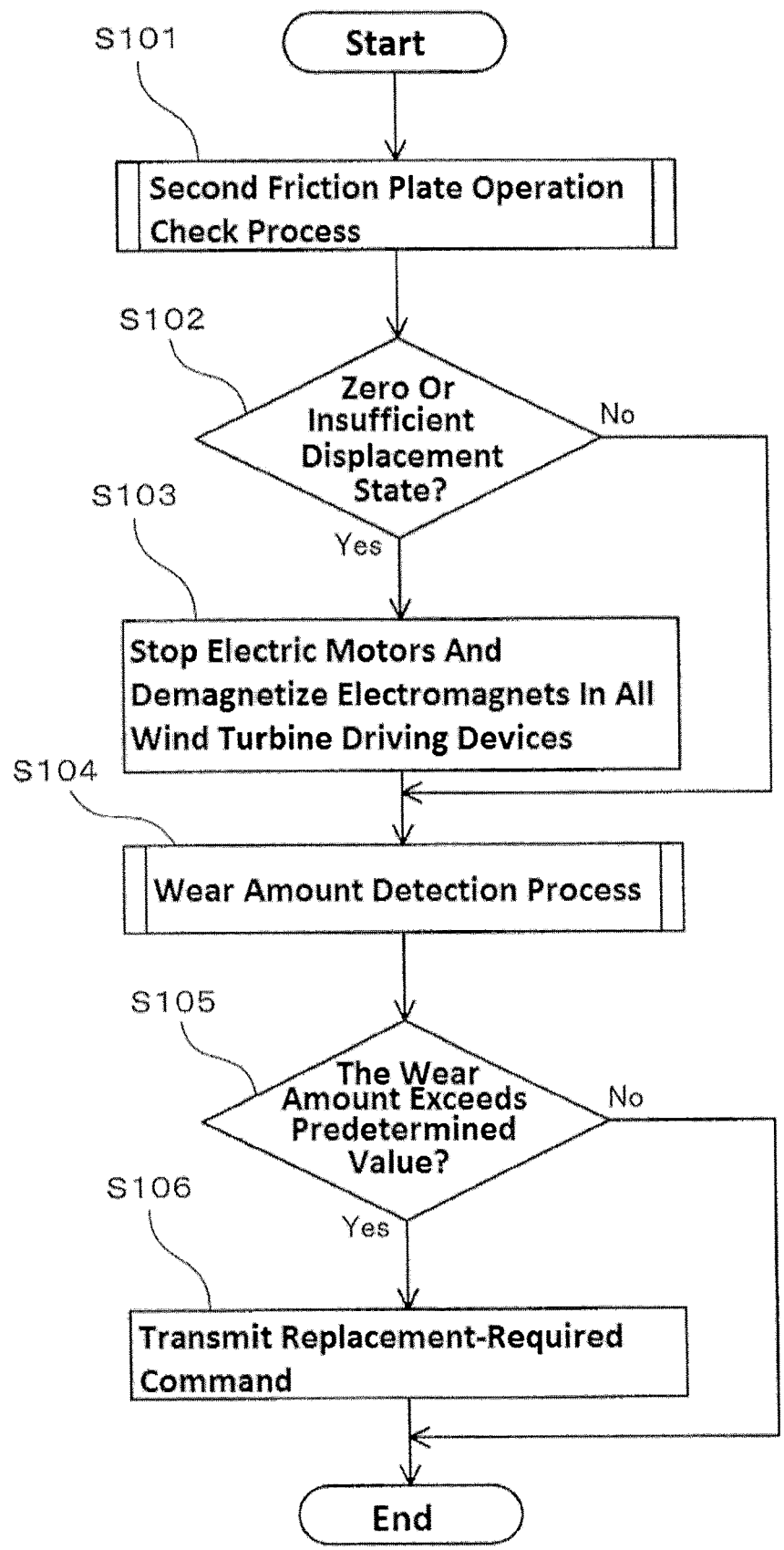
FIG. 6 is a flow chart of operation of the wind turbine driving device and the wind turbine driving device unit of FIG. 2.
Figure 7:
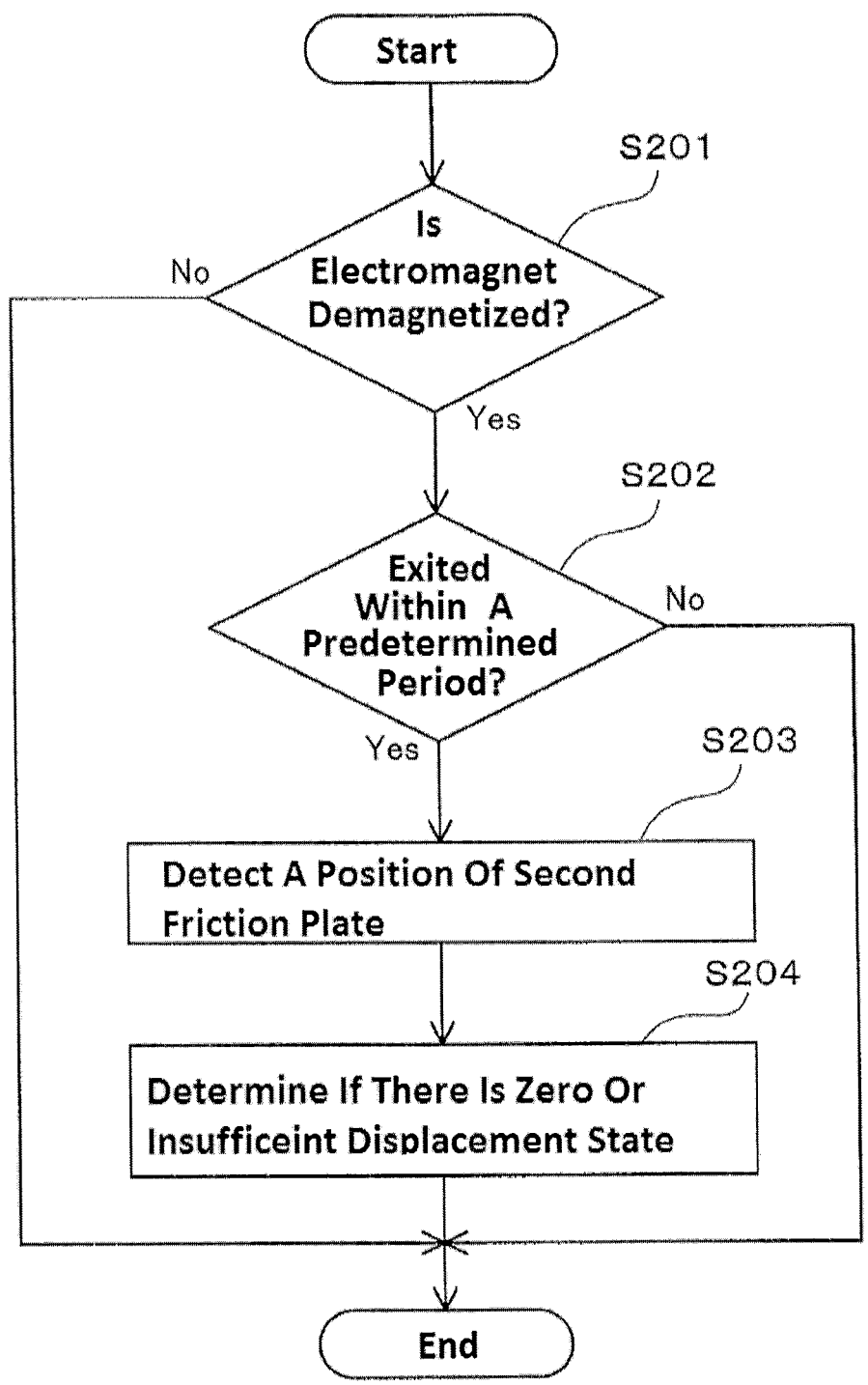
FIG. 7 is a flow chart of a second friction plate operation check process mentioned in the flow chart of FIG. 6.
Figure 8:
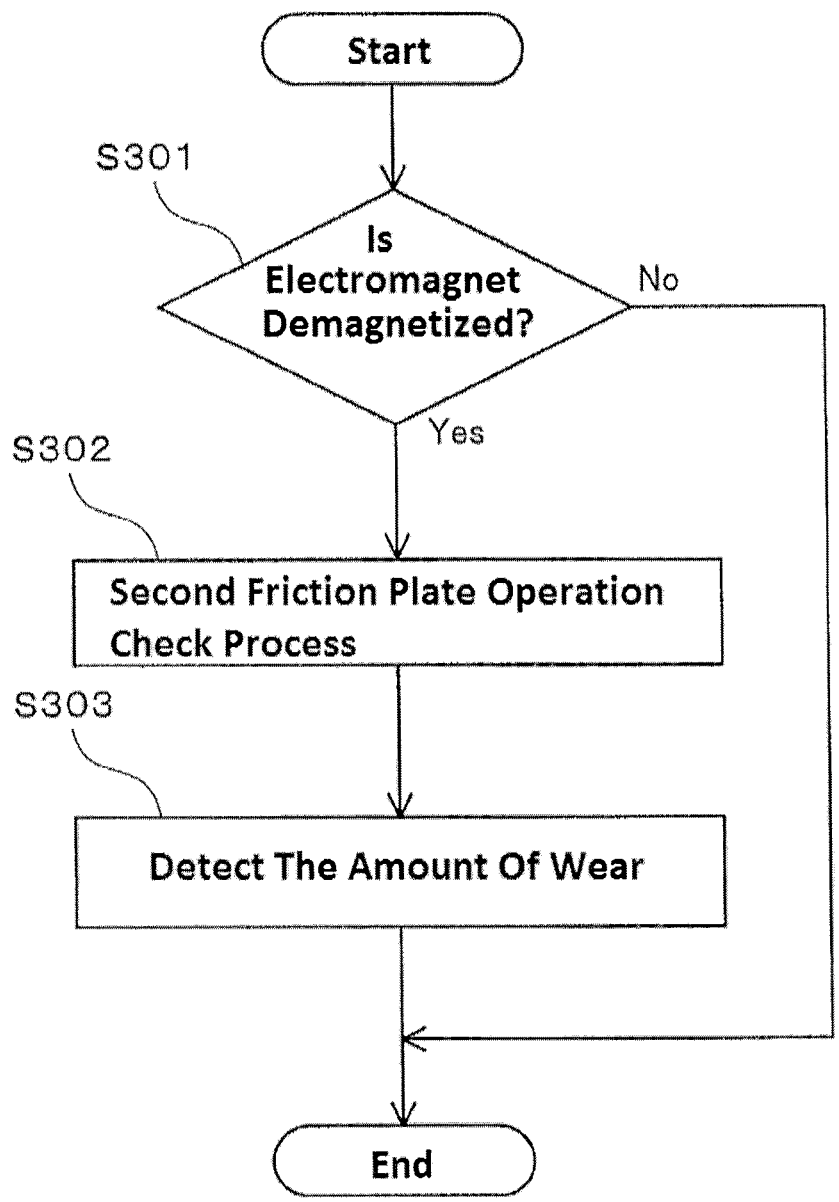
FIG. 8 is a flow chart of a wear amount detection process mentioned in the flow chart of FIG. 6.

FIG. 6 is a flow chart for describing operations of the wind turbine driving device 1 and the wind turbine driving device unit 10 including the second friction plate operation check process and the wear amount detection process. FIG. 7 is a flow chart of the second friction plate operation check process mentioned in the flow chart of FIG. 6. FIG. 8 is a flow chart of the wear amount detection process mentioned in the flow chart of FIG. 6.

The control unit 11 may perform steps shown in FIG. 6 on each wind turbine driving device 1. For instance, the control unit 11 may repeatedly perform the steps shown in FIG. 6 for each of the wind turbine driving devices 1 sequentially. Once the process of FIG. 6 is completed for all the wind turbine driving devices 1, the process of FIG. 6 is started again and performed sequentially on each wind turbine driving device 1. Moreover each time the process of FIG. 6 is completed for all the wind turbine driving devices 1, the process of FIG. 6 is sequentially iterated for each wind turbine driving device 1.

When steps of FIG. 6 are performed, the control unit 11 may firstly perform the second friction plate operation check process (Step S101). More specifically, a process shown in FIG. 7 is performed as the second friction plate operation check process. In the second friction plate operation check process of FIG. 7, firstly whether the electromagnet 32 is in a demagnetized state or not is determined (Step S201). When the electromagnet 32 is in an excited state (Step S201: No), the second friction plate operation check process of FIG. 7 may be temporarily ended. As described above, the excitation and demagnetization of the electromagnet 32 is performed based on a command from the control unit 11. The control unit 11 may perform Step S201 depending on a status of the command issued for the electromagnet 32.

When the electromagnet 32 is demagnetized (Step S201: Yes), it is determined whether an excitation operation was performed within a predetermined period of time after Step S201 had been performed (Step S202). The predetermined period of time in Step S202 may be adequately set in advance. When the control unit 11 issued a command to excite the electromagnet 32 within the predetermined period of time after Step S201 had been performed, it is determined that the excitation was performed in the predetermined period of time. The control unit 11 may determine whether the excitation was performed within a predetermined limited period of time after Step S201 had been performed. Therefore the control unit 11 can know whether operation to transition the electromagnet 32 from the demagnetized state to the excited state was performed.

When it is determined that the excitation was not performed within the predetermined period of time after Step S201 had been performed (Step S202: No), the second friction plate operation check process of FIG. 7 is temporarily ended. Whereas when it is determined that the excitation was performed within the predetermined period of time after Step S201 had been performed (Step S202: Yes), the control unit 11 receives a result of the position detection of the second friction plate 30 performed by the detector 34 and detects the position of the second friction plate 30 (Step S203).

When the control unit 11 detects the position of the second friction plate 30 that was detected by the detector 34 (Step S203), the control unit 11 conducts Step S204. In Step S204, the control unit 11 may determine whether a zero-displacement state of the second friction plate 30 where the position of the second friction plate 30 is unchanged occurs or not based on the detected position of the second friction plate 30. In Step S204, the control unit 11 may determine whether an insufficient displacement state of the second friction plate 30 where the second friction plate 30 is drawn but does not reach a predetermined position by the magnetic force of the electromagnet 32 occurs or not. Here, the predetermined position may be adequately set in advance. For example, the position may be set at a certain distance from the end surface of the electromagnetic body 32a that faces the second friction plate 30.

When the first friction plate 29 and the second friction plate 30 that generate a braking force are stuck to each other, the above-mentioned zero-displacement state is detected. When the second friction plate 30 is separated from the first friction plate 29 but the second friction plate 20 is somehow engaged with other member and the second friction plate 30 is not displaced to an appropriate position, the above-mentioned insufficient displacement state is detected. In this manner, the control unit 11 checks the operation of the second friction plate 30 and detects malfunction of the second friction plate 30 by carrying out the process of FIG. 7. In the embodiment, the control unit 11 may be configured to check operation of the second friction plate 30 based on the position of the second friction plate 30 detected by the detector 34 to detect malfunction of the second friction plate 30 when the electromagnet 32 is transitioned from a demagnetized state to an excited state.

After Step 204 is performed, Step S102 and the following steps shown in FIG. 6 are carried out. In Step S102, whether the zero-displacement state or the insufficient displacement state occurs is determined based on the result of the second friction plate operation check process (Step S101). When it is determined that the zero-displacement state or the insufficient displacement occurs (Step S102: Yes), a command to stop the operation of the electric motor 22 and a command to demagnetize the electromagnet 32 are issued for all the wind turbine driving devices 1 from the control unit 11 (Step S103). In this way, when a malfunction of the second friction plate 30 occurs in any of the wind turbine driving devices 1, the electric motors 22 in all the wind turbine driving devices 1 are stopped and rotation of the output shafts 22a in all the wind turbine driving devices 1 are braked. When it is determined that the zero-displacement state or insufficient displacement state is not occurring (Step S102: No), Step S103 is not carried out but the wear amount detection process (Step S104) is performed.

As described above, if the zero-displacement state or the insufficient displacement state of the second friction plate 30 in any of the wind turbine driving devices 1 is detected when the electromagnet 32 is transitioned from a demagnetized state to an excited state, the control unit 11 stops operation of the electric motors 22 in all the wind turbine driving devices 1. Moreover, the control unit 11 demagnetizes the electromagnets 32 in all the wind turbine driving devices 1 when the control unit 11 stops operation of the electric motors 22 in all the wind turbine driving devices 1. In this way, when malfunction of the second friction plate 30 occurs in any of the wind turbine driving devices 1 in the wind turbine driving device unit 10, it is possible to prevent an external force from the wind turbine driving devices 1 in which the second friction plates operate normally from working on the wind turbine driving device 1 in which the malfunction occurs.

After Step S102 and Step S103 are carried out, the wear amount detection process (Step S104) is performed. The process shown in FIG. 8 is performed as the wear amount detection process. In the wear amount detection process of FIG. 8, firstly whether the electromagnet 32 is in a demagnetized state or not is determined (Step S301). When the electromagnet 32 is in an excited state (Step S301: No), the wear amount detection process of FIG. 8 may be temporarily ended.

When the electromagnet 32 is demagnetized (Step S301: Yes), the control unit 11 receives a result of the position detection of the second friction plate 30 performed by the detector 34 and detects the position of the second friction plate 30 (Step S302). When the control unit 11 detects the position of the second friction plate 30 that was detected by the detector 34 (Step S203), the control unit 11 conducts Step S303. In Step S303, the control unit 11 detects the amount of wear of the first friction plate 29 and the second friction plate 30 based on the detected position of the second friction plate 30.

If the first friction plate 29 and/or the second friction plate 30 is worn, the position of the second friction plate 30 in the state where the electromagnet 32 is demagnetized changes in accordance with the amount of wear. More specifically, when the wear of the friction plate advances, the position of the second friction plate 30 in the state where the electromagnet 32 is demagnetized moves away from the electromagnet 32 from the original position where the second friction plate 30 was initially disposed when the electromagnet 32 is in a demagnetized state. The control unit 11 calculates the wear amount of the first friction plate 29 and the second friction plate 30 as the amount of positional change of the second friction plate based on the detection result of the position of the second friction plate 30. The amount of positional change may be calculated as a change from the original position of the second friction plate 30 where the second friction plate 30 was initially disposed in the state where the electromagnet 32 is demagnetized to the detected position of the second friction plate 30.

After Step 303 is performed, Step S105 and the following steps shown in FIG. 6 are carried out. In Step S105, it is determined whether the calculated wear amount is equal to or more than a predetermined value based on the result of the wear amount detection process (Step S104). Here, the predetermined value of the wear amount is adequately set in advance in consideration of, for example, an acceptable range of the wear amount of the first friction plate 29 and the second friction plate 30 in which the braking mechanism 23 is able to generate a necessary braking force.

When the wear amount detected in the wear amount detection process (Step S104) is equal to or larger than the predetermined value (Step S105: Yes), the control unit 11 transmits a replacement-required command to the upper-level control device 37 (Step S106). Here, the replacement-required command is a command indicating that replacement of the first friction plate 29 and the second friction plate 30 in the wind turbine driving device 1 in which the detected wear amount is equal to or more than the predetermined value is required. Whereas when the wear amount detected in Step S105 is smaller than the predetermined value or when detection of the wear amount is not performed since the electromagnet 32 is not demagnetized, Step S106 is not performed and the process of FIG. 6 is temporarily ended.

As described above, when the wear amount detected in the wear amount detection process is equal to or larger than the predetermined value in any of the wind turbine driving devices 1, the control unit 11 may transmit, to the upper-level control device 37, the replacement-required command indicating that replacement of the first friction plate 29 and the second friction plate 30 in the wind turbine driving device 1 in which the detected wear amount is equal to or more than the predetermined value is required. When the control device 37 received the replacement-required command, for instance, the control device 37 displays alarm based on the replacement-required command on a display monitor which a worker who manages and maintains the operation of the wind turbine watches. In this manner, the worker is able to promptly know that there is a wind turbine driving device 1 in which the first friction plate 29 and the second friction plate 30 need to be replaced.

After the process of FIG. 6 is completed for one wind turbine driving device 1, the process of FIG. 6 is resumed for another wind turbine driving device 1. Eventually the process of FIG. 6 is performed on all the wind turbine driving devices 1. Moreover each time the process of FIG. 6 has been performed for all of the wind turbine driving devices 1, the process of FIG. 6 is iterated again for each wind turbine driving device 1.

Advantageous Effects of the Embodiment

As described above, in the embodiment, the second friction plate 30 is attracted to the electromagnet 32 by the magnetic force of the electro magnet 32 against the elastic force of the elastic members 31 when the electromagnet 32 is excited, and the second friction plate 30 moves away from the first friction plate 29. In this way, a state where a braking force is not generated is maintained. When the electromagnet 32 is demagnetized, the second friction plate 30 is pressed toward the first friction plate 29 by the elastic force of the elastic members 31 and the braking force is generated therebetween. When the electromagnet 32 is excited again, the braking force is canceled.

Moreover, in the embodiment, the wind turbine driving device 1 includes the detection target portion 33 that is fixed on the second friction plate 30 and displaced along with the second friction plate 30, and the detector 34 that is configured to detect the position and displacement of the detection target portion 33. Operation of the second friction plate 30 is detected and checked based on a result of detection performed by the detector 34. In this way, it is possible to easily detect occurrence of a malfunction in the second friction plate 30. Moreover, based on the detection result from the detector 34, the wear amount of the first friction plate 29 and the second friction plate 39 is detected. In this way, it is possible to easily know the amount of wear. In the embodiment, with the simple configuration in which the detection target portion 33 is provided on the second friction plate 30 and the detector 34 is provided to detect the position and displacement of the detection target portion 33, it is possible to check the operation of the second friction plate 30 and to detect the wear amount of the first and second friction plates 29, 30.

Therefore, according to the embodiment, it is possible to provide the wind turbine driving devices 1 and the wind turbine driving device unit 10 in which the wear amount of the first and second friction plates 29, 30 can be easily known and a malfunction of the second friction plate 30 can be easily detected.

Furthermore, a malfunction of the second friction plate 30 is easily detected when the electromagnet 32 is transitioned from the demagnetized state to the excited state, and the wear amount of the first and second friction plates 29, 30 is easily detected when the electromagnet 32 is in a demagnetized state.

In the embodiment, in the plurality of the wind turbine driving device 1, whether the zero-displacement state or the insufficient displacement state of the second friction plate 30 occurs is determined when the electromagnet 32 is transitioned from the demagnetized state to the excited state. When the zero-displacement state or the insufficient displacement state is detected in any of the wind turbine driving devices 1, the electric motors 22 in all the wind turbine driving devices 1 are stopped. In other words, not only in the wind turbine driving device 1 in which the zero-displacement state or the insufficient displacement state occurs but also in all the wind turbine driving devices 1, operation of the electric motors 22 are stopped. Therefore when a malfunction of the second friction plate 30 occurs in any of the wind turbine driving devices 1, it is possible to prevent external forces from the other wind turbine driving devices 1 from working concentratedly on the output portion 25 of the wind turbine driving device 1 in which the malfunction of the second friction plate 30 occurs. In this way, it is possible to prevent breakage of the ring gear 107 and the like in the wind turbine driving device 1 or the wind turbine 101.

Furthermore, in the embodiment, if the zero-displacement state or the insufficient displacement state of the second friction plate 30 is detected in any of the wind turbine driving devices 1 when the electromagnet 32 is transitioned from a demagnetized state to an excited state, the electric motors 22 in all the wind turbine driving devices 1 are stopped and the electromagnets 32 are demagnetized. In other words, not only in the wind turbine driving device 1 in which the zero-displacement state or the insufficient displacement state occurs but also in all the wind turbine driving devices 1, a braking force is generated. Therefore when a malfunction of the second friction plate 30 occurs in any of the wind turbine driving devices 1, it is possible to prevent an external force of wind from working concentratedly on the output portion 25 of the wind turbine driving device 1 in which the malfunction of the second friction plate 30 occurs. In this way, it is possible to reliably prevent breakage of the ring gear 107 and the like in the wind turbine driving device 1 or in the wind turbine 101.

Furthermore, in the embodiment, when the wear amount of the first and second friction plates 29, 30 in any of the wind turbine driving devices 1 is equal to or larger than a predetermined value, the replacement-required command is transmitted to the upper-level control device 37. The replacement-required command notifies that replacement of the first and second friction plates 29, 30 in the wind turbine driving device 1 in which the wear amount of the first and second friction plates 29, 30 is equal to or more than the predetermined value is required. Therefore, the upper-level control device 37 can know the wind turbine driving device 1 in which the replacement of the first and second friction plates 29, 30 is required based on the replacement-required command transmitted by the control unit 11.

Modification Examples

Although the embodiments of the invention have been described above, the invention is not restricted to the above-described embodiments, and various modifications are possible within the scope of the claims. For example, the following modifications are possible.

(1) In the above-described embodiment, permanent magnet is used as the detection target portion and the magnetic sensor is used as the detector. However, the detection target portion and the detector are not limited to these. More specifically, a detection unit including a detection target portion that is in the form of any member other than permanent magnet and fixed on the second friction plate, and a detector that is in the form of any member other than a magnetic sensor and configured to detect the position and displacement of the detection target portion moving along with the second friction plate may be used. For instance, a detection unit including a coil and a case that houses the coil as the detector, and a probe as the detection target portion may be used.

In the above example, the detector may be attached to the housing of the braking mechanism. The probe that is displaced relative to the detector may be fixed on the second friction plate and moves along with the second friction plate. Within the detector, a primary coil and a secondary coil may be provided. The probe has a moving core that is relatively displaced on the inner side of the coil in the detector. In this way, the detector is configured to detect the position and displacement of the detection target portion that is displaced along with the second friction plate. In this detector, a signal based on an induced voltage generated in the secondary coil in accordance with a position and displacement of the moving core of the probe may be generated when the primary coil is excited. Moreover, the detector may be coupled to the control unit that controls operations of the plurality of wind turbine driving devices. The above-mentioned signal is output to the control unit as a detection result of the position and displacement of the detection target portion. Even when the invention is implemented as the wind turbine driving device and the wind turbine driving device unit in which the detection target portion and detector of the above-described modification example are provided, the same advantageous effects as the above embodiment can be obtained.

Figure 9:
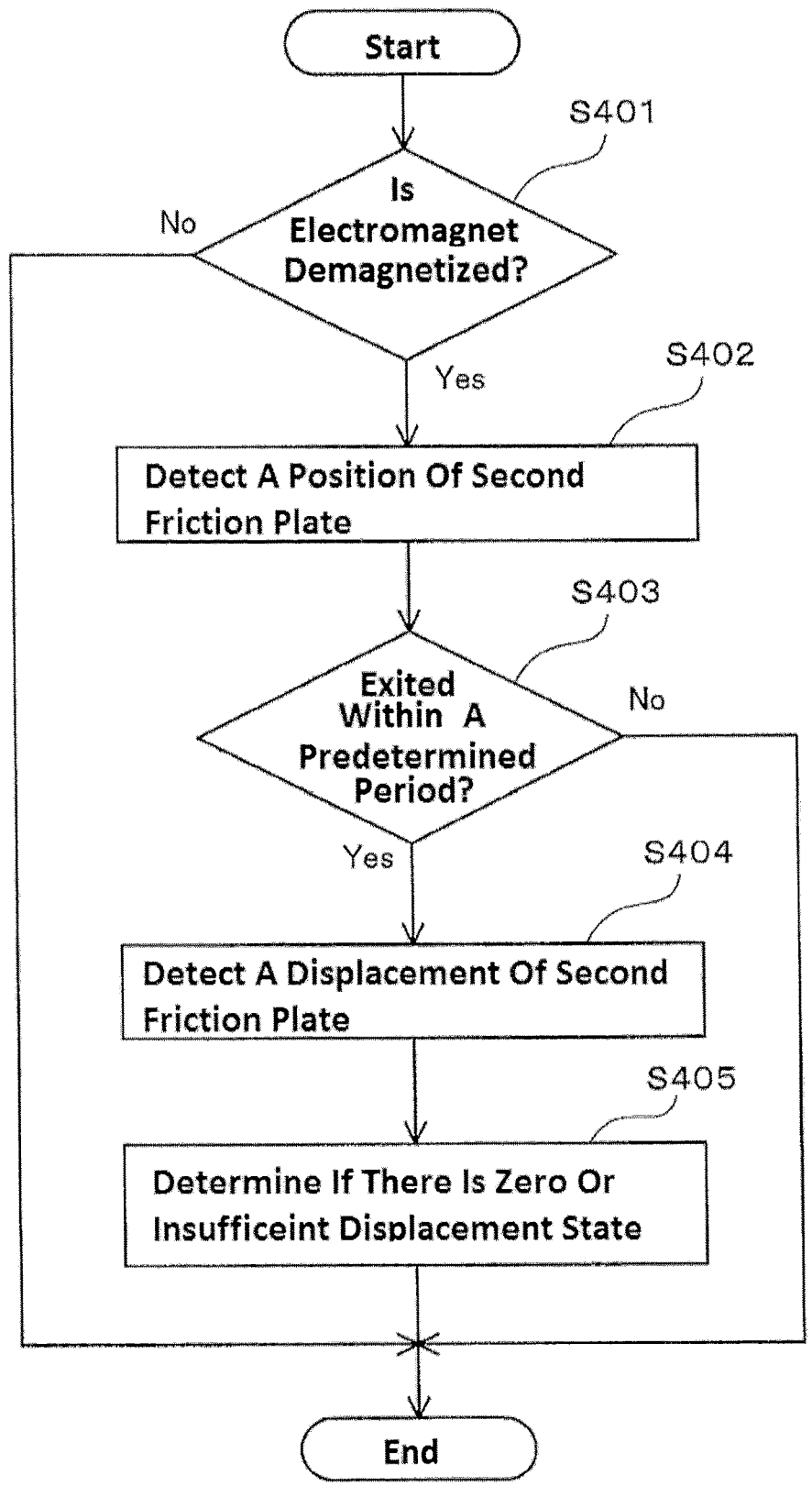
FIG. 9 is a flow chart of a second friction plate operation check process in a modification example.

(2) In the above-described embodiment, the wind turbine driving device 1 is configured such that the operation of the second friction plate 30 is checked by detecting the position of the second friction plate 30 by the detector 34 when the electromagnet 32 is transitioned from a demagnetized state to an excited state. However, the way of detection is not limited to this. For example, the invention may be implemented as the wind turbine driving device in which the operation of the second friction plate 30 is checked by detecting the displacement of the second friction plate 30 by the detector 34 when the electromagnet 32 is transitioned from a demagnetized state to an excited state, and may be also implemented as the wind turbine driving device unit that includes such wind turbine driving devices. FIG. 9 is a flow chart for describing a second friction plate operation check process in the modification example. The process shown in FIG. 9 is applied to the wind turbine driving device and the wind turbine driving device unit of the above-described modification example.

The second friction plate operation check process shown in FIG. 9 is for example performed instead of the second friction plate operation check process (Step S101) shown in FIG. 6 described in the above embodiment. More specifically, in this modification example, the detection target portion 33, the detector 34, and the control unit 11 carry out the steps shown in FIG. 9 instead of the steps shown in FIG. 7. In the following description of the process of FIG. 9, the same reference numerals as those of the above-described embodiment are used for the similar steps and configurations as the above embodiment and those descriptions will be hereunder omitted.

In the second friction plate operation check process of FIG. 9, firstly whether the electromagnet 32 is in a demagnetized state or not may be determined (Step S401). Step 401 is performed in the same manner as Step S201 of FIG. 7. When the electromagnet 32 is demagnetized (Step S401: Yes), the detector 34 detects a position of the second friction plate 30 based on a command from the control unit 11 (Step S402). A result of the detection may be received by the control unit 11 at the timing synchronized with a detection timing. After Step 402 is carried out, it is determined whether an excitation operation was performed within a predetermined period of time after Step S401 had been performed (Step S403). Step 403 is performed in the same manner as Step S202 of FIG. 7.

When it is determined that an excitation operation was performed within the predetermined period of time after Step S401 had been performed (Step S403: Yes), the detector 34 detects a displacement of the second friction plate 30 in response to a command from the control unit 11 (Step S404). The displacement of the second friction plate detected at that time is detected as a displacement from the position of the second friction plate 30 detected in Step S402. A detection result of the displacement of the second friction plate 30 detected by the detector 34 is received by the control unit 11.

After the displacement of the second friction plate 30 is detected, Step 405 is carried out. In Step S405, the control unit 11 may determine whether a zero-displacement state of the second friction plate 30 where the position of the second friction plate 30 is unchanged occurs or not based on the detected displacement of the second friction plate 30. In Step S405, the control unit 11 may determine whether an insufficient displacement state of the second friction plate 30 where the second friction plate 30 is not drawn to a predetermined position by the magnetic force of the electromagnet 32 occurs or not.

When the first friction plate 29 and the second friction plate 30 that generate a braking force are stuck to each other, the above-mentioned zero-displacement state is detected. When the second friction plate 30 is separated from the first friction plate 29 but the second friction plate 20 is somehow engaged with other member and the second friction plate 30 is not displaced to an appropriate position, the above-mentioned insufficient displacement state is detected. In this manner, the control unit 11 checks the operation of the second friction plate 30 and detects malfunction of the second friction plate 30 by carrying out the process of FIG. 9. In the embodiment, the control unit 11 may be configured to check operation of the second friction plate 30 based on the displacement of the second friction plate 30 detected by the detector 34 to detect malfunction of the second friction plate 30 when the electromagnet 32 is transitioned from a demagnetized state to an excited state.

In this modification example, a malfunction of the second friction plate 30 is also easily detected when the electromagnet 32 is transitioned from the demagnetized state to the excited state in the same manner as the above-described embodiment.

Figure 10:
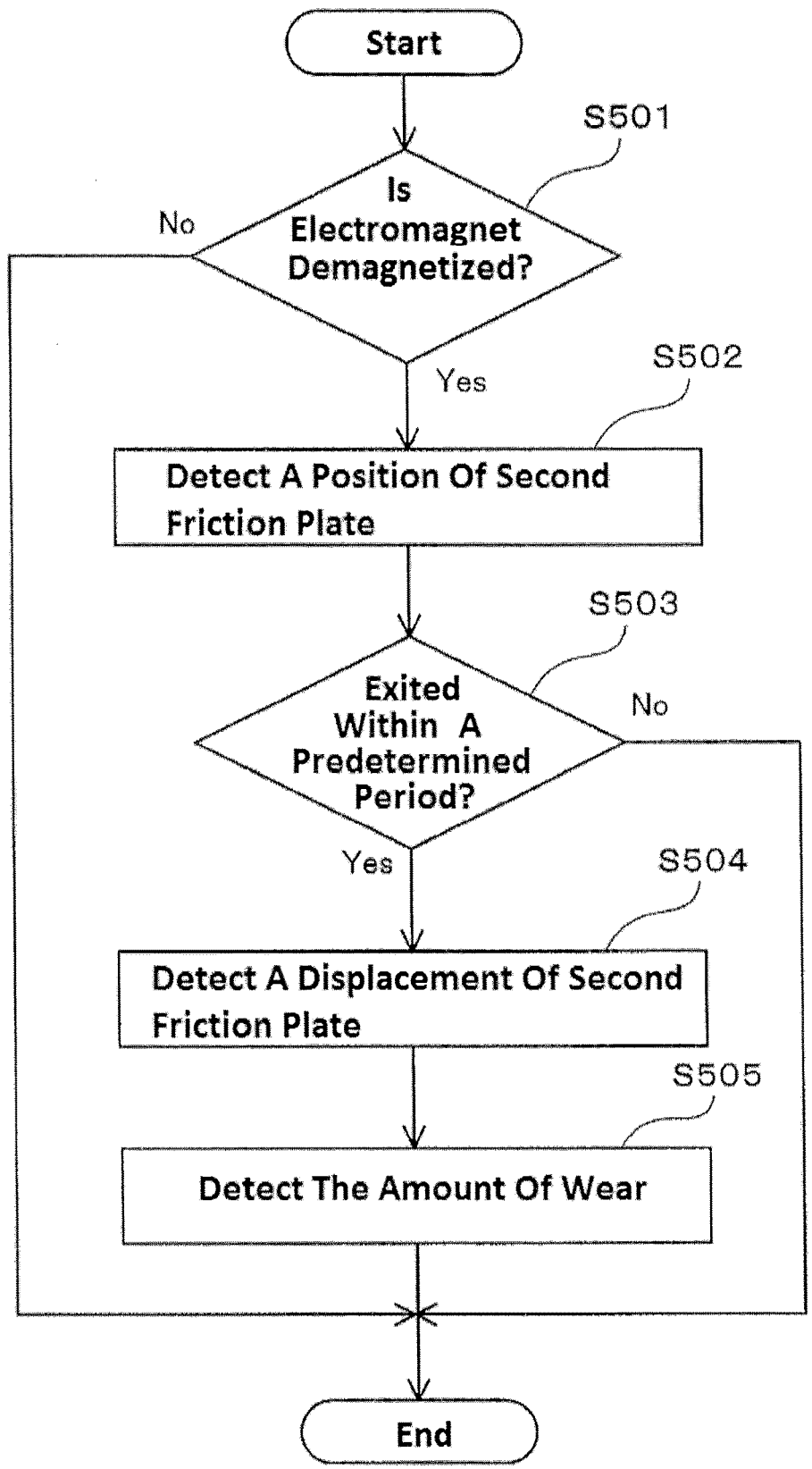
FIG. 10 is a flow chart of a wear amount detection process in the modification example.

(3) In the above-described embodiment, the wind turbine driving device 1 is configured such that the position of the second friction plate 30 is detected by the detector 34 to detect the wear amount of at least the first friction plate 29 or the second friction plate 30 or both when the electromagnet 32 is a demagnetized state. However, the way of detection is not limited to this. For example, the invention may be implemented as the wind turbine driving device in which the wear amount of at least the first friction plate 29 or the second friction plate 30 or both is detected by detecting the displacement of the second friction plate 30 using the detector 34 when the electromagnet 32 is transitioned from a demagnetized state to an excited state, and may be also implemented as the wind turbine driving device unit that includes such wind turbine driving devices. FIG. 10 is a flow chart for describing the wear amount detection process in the modification example. The process shown in FIG. 10 is applied to the wind turbine driving device and the wind turbine driving device unit of the above-described modification example.

The wear amount detection process shown in FIG. 10 is for example performed instead of the wear amount detection process (Step S104) shown in FIG. 6 described in the above embodiment. More specifically, in this modification example, the detection target portion 33, the detector 34, and the control unit 11 carry out the steps shown in FIG. 10 instead of the steps shown in FIG. 8. In the following description of the process of FIG. 10, the same reference numerals as those of the above-described embodiment or the above-described modification example are used for the similar steps and configurations as the above embodiment or modification example and those descriptions will be hereunder omitted.

In the wear amount detection process of FIG. 10, firstly whether the electromagnet 32 is in a demagnetized state or not is determined (Step S501). Step 501 is performed in the same manner as Step S301 of FIG. 8. When the electromagnet 32 is demagnetized (Step S501: Yes), the detector 34 detects a position of the second friction plate 30 in response to a command from the control unit 11 (Step S502). A result of the detection may be received by the control unit 11 at the timing synchronized with a detection timing. After Step 502 is carried out, it is determined whether an excitation operation was performed within a predetermined period of time after Step S501 had been performed (Step S503). Step 503 is performed in the same manner as Step S202 of FIG. 7 or Step S403 of FIG. 9.

When it is determined that an excitation operation was performed within the predetermined period of time after Step S501 had been performed (Step S503: Yes), the detector 34 detects a displacement of the second friction plate 30 in response to a command from the control unit 11 (Step S504). The displacement of the second friction plate detected at that time is detected as a displacement from the position of the second friction plate 30 detected in Step S502. A detection result of the displacement of the second friction plate 30 detected by the detector 34 is received by the control unit 11.

After the displacement of the second friction plate 30 is detected, Step 505 is carried out. In Step S505, the control unit 11 detects the amount of wear of the first friction plate 29 and the second friction plate 30 based on the detected displacement of the second friction plate 30.

If the first friction plate 29 and/or the second friction plate 30 is worn, the displacement of the second friction plate 30 that occurs when the electromagnet 32 is transitioned from a demagnetized state to an excited state changes in accordance with the amount of wear. More specifically, when the wear of the friction plate advances, the displacement of the second friction plate 30 that occurs when the electromagnet 32 is transitioned from a demagnetized state to an excited state is increased from the corresponding displacement at a time when the second friction plate 30 was initially disposed. The control unit 11 calculates an increase in the displacement from the original displacement measured when the second friction plate was initially disposed based on the detection result of the displacement of the second friction plate 30, and detects the wear amount of the first friction plate 29 and the second friction plate 30 from the calculated increase.

In this modification example, it is possible to easily know the wear amount of the first and second friction plates 29, 30 when the electromagnet 32 is transitioned from the demagnetized state to the excited state. In the wind turbine driving device and the wind turbine driving device unit according to the modification example, the second friction plate operation check process same as the above embodiment may also be performed. Therefore a malfunction of the second friction plate 30 can be easily detected when the electromagnet 32 is transitioned from the demagnetized state to the excited state.

Figure 11:
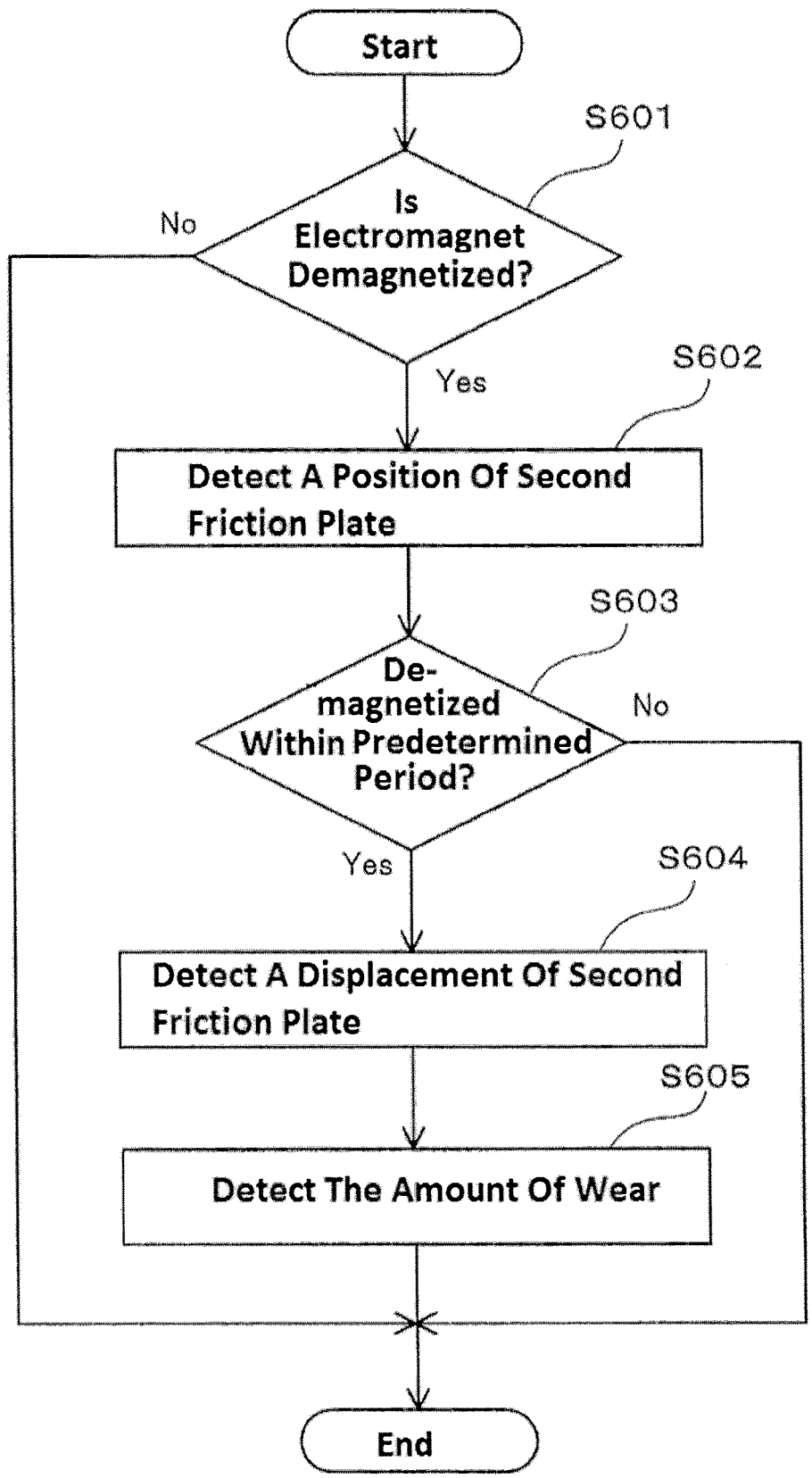
FIG. 11 is a flow chart of a wear amount detection process in a modification example.

(4) As an modification example other than the above-described modification example, the invention may be implemented as the wind turbine driving device in which the wear amount of at least the first friction plate 29 or the second friction plate 30 or both is detected by detecting the displacement of the second friction plate 30 using the detector 34 when the electromagnet 32 is transitioned from an excited state to a demagnetized state, and may be also implemented as the wind turbine driving device unit that includes such wind turbine driving devices. FIG. 11 is a flow chart for describing a wear amount detection process in such a modification example. The process shown in FIG. 11 is applied to the wind turbine driving device and the wind turbine driving device unit of the above-described modification example.

The wear amount detection process shown in FIG. 11 is for example performed instead of the wear amount detection process (Step S104) shown in FIG. 6 described in the above embodiment. More specifically, in this modification example, the detection target portion 33, the detector 34, and the control unit 11 carry out the steps shown in FIG. 11 instead of the steps shown in FIG. 8. In the following description of the process of FIG. 11, the same reference numerals as those of the above-described embodiment or the above-described modification example are used for the similar steps and configurations as the above embodiment or modification example and those descriptions will be hereunder omitted.

In the wear amount detection process of FIG. 11, firstly whether the electromagnet 32 is in an excited state or not is determined (Step S601). When the electromagnet 32 is in a demagnetized state (Step S601: No), the wear amount detection process of FIG. 8 may be temporarily ended. When the electromagnet 32 is excited (Step S601: Yes), the detector 34 detects a position of the second friction plate 30 in response to a command from the control unit 11 (Step S602). A result of the detection may be received by the control unit 11 at the timing synchronized with a detection timing. After Step 602 is carried out, it is determined whether a demagnetization operation was performed within a predetermined period of time after Step S601 had been performed (Step S603). When the control unit 11 issued a command to demagnetize the electromagnet 32 within the predetermined period of time after Step S601 had been performed, it is determined that the demagnetization was performed in the predetermined period of time.

When it is determined that the demagnetization operation was performed within the predetermined period of time after Step S601 had been performed (Step S603: Yes), the detector 34 detects a displacement of the second friction plate 30 in response to a command from the control unit 11 (Step S604). The displacement of the second friction plate detected at that time is detected as a displacement from the position of the second friction plate 30 detected in Step S602. A detection result of the displacement of the second friction plate 30 detected by the detector 34 is received by the control unit 11.

After the displacement of the second friction plate 30 is detected, Step 605 is carried out. In Step S605, the control unit 11 detects the amount of wear of the first friction plate 29 and the second friction plate 30 based on the detected displacement of the second friction plate 30. The control unit 11 calculates an increase in the displacement from the original displacement measured when the second friction plate was initially disposed based on the detection result of the displacement of the second friction plate 30, and detects the wear amount of the first friction plate 29 and the second friction plate 30 from the calculated increase.

In this modification example, the wear amount of the first and second friction plates 29, 30 is easily known when the electromagnet 32 is transitioned from the excited state to the demagnetized state. In the wind turbine driving device and the wind turbine driving device unit according to the modification example, the second friction plate operation check process same as the above embodiment may also be performed. Therefore a malfunction of the second friction plate can be easily detected when the electromagnet 32 is transitioned from the demagnetized state to the excited state.

(5) In the above-described embodiment, the wind turbine driving device is used as a yaw driving device. However, the invention is not limited to this. The invention may be implemented as a wind turbine driving device that drives blades configured to be rockable in a pitch direction with respect to a rotor attached to the nacelle, and as a wind turbine driving device unit that includes a plurality of such wind turbine driving devices.

Figure 12:
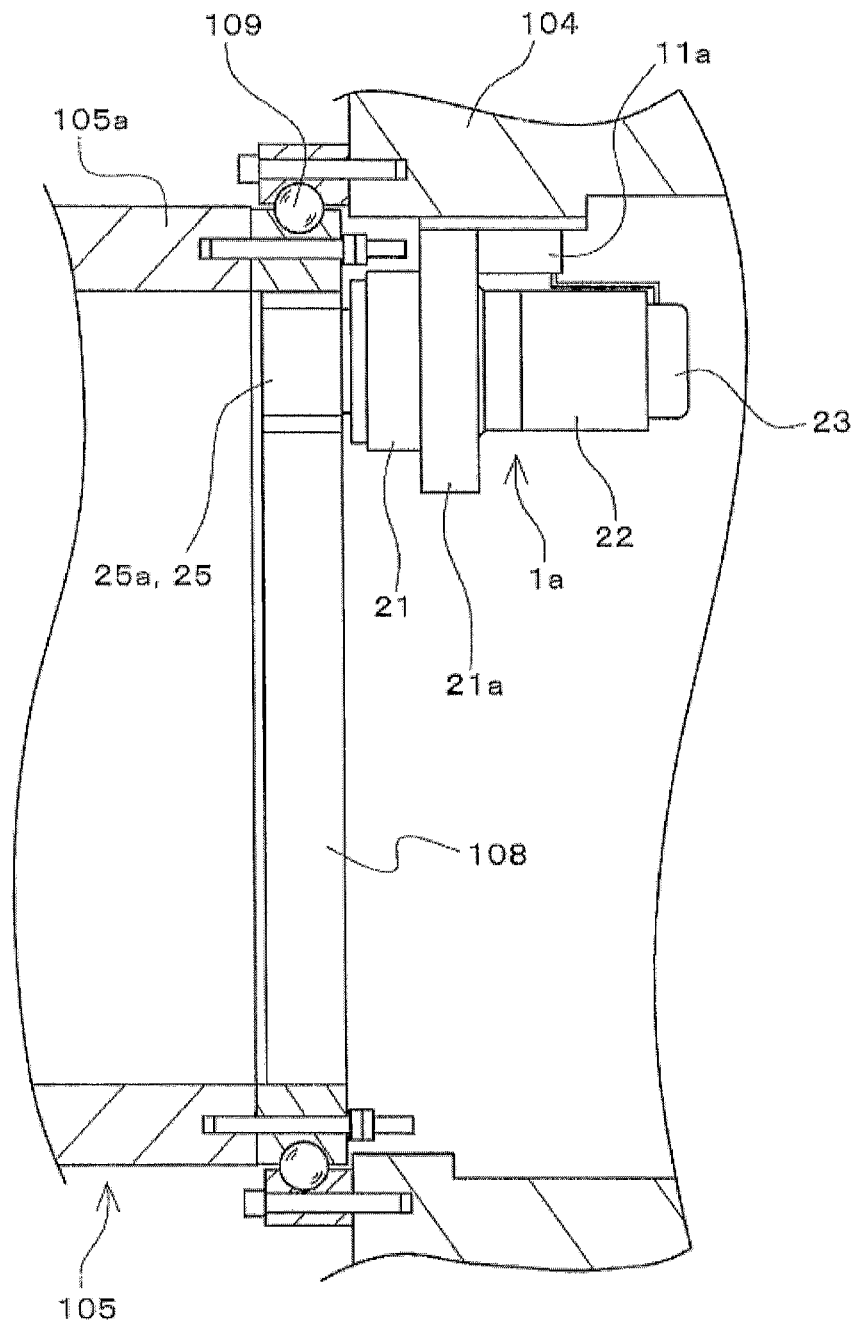
FIG. 12 is an enlarged sectional view of a portion where a blade is attached to a rotor of the wind turbine and is provided rockably in a pitch direction to illustrate a wind turbine driving device that serves as a pitch driving device.

FIG. 12 is an enlarged sectional view of a portion where a blade 105 is attached to a rotor 104 of the wind turbine 101 provided rockably in a pitch direction to illustrate a wind turbine driving device 1a that serves as a pitch driving device. In the following description, the same reference numerals as those of the above-described embodiment are used for the similar components as the above embodiment and those descriptions will be hereunder omitted.

The wind turbine driving device 1a illustrated in FIG. 12 may be configured in the same manner as the wind turbine driving device 1 of the above embodiment. More specifically, the wind turbine driving device 1a may include the body 21, the electric motor 22, the braking mechanism 23, the speed reducer 24 and the output portion 25 that are configured similarly as those in the wind turbine driving device 1. The profile of the body 21 of the wind turbine driving device 1a is partially different from that of the body 21 of the wind turbine driving device 1.

The wind turbine driving device 1a is provided as a pitch driving device and may be attached to the rotor 104 at the position where the blade 105 is coupled to the rotor 104. An opening is formed in the rotor 104 where the blade 105 is coupled and blades 105 are partially disposed in the opening such that an end portion of a shaft portion 105a of the blade 105 faces to each other. Each blade 105 is supported at the shaft portion 105a by the rotor 105 via a bearing 109 and is configured to be rockable relative to the rotor 104 in a pitch direction (in a rotational direction centering on the shaft center of the shaft portion 105a of the blade 105). At the end of the shaft portion 105a where the rotor 104 is attached, a ring gear 108 that has an internal tooth arranged along the inner periphery is provided (note that the inner tooth of the ring gear 108 is not shown in FIG. 12). The ring gear 108 may be disposed such that its center coincides with the shaft center of the shaft portion 105a.

The wind turbine driving device 1a is disposed on the rotor 104 such that the pinion 25a provided on the output portion 25 meshes with the ring gear 108 provided in the wind turbine 101. An attachment flange 21a that is attached and fixed to the rotor 104 may be provided on the body 21 of the wind turbine driving device 1a.

The wind turbine driving device 1a is configured to operated based on control performed by a control unit 11a that is configured similarly to the control unit 11 of the above embodiment. For example, in the same manner as the above embodiment, the control unit 11a may be configured to check operation of the second friction plate 30 based on the position of the second friction plate 30 detected by the detector 34 when the electromagnet 32 is transitioned from a demagnetized state to an excited state. Therefore the wind turbine driving device 1a is configured such that the operation of the second friction plate 30 is checked by detecting the position of the second friction plate 30 using the detector 34 when the electromagnet 32 is transitioned from a demagnetized state to an excited state.

Moreover, in the same manner as the above embodiment, the control unit 11a may be configured to detect the amount of wear of at least the first friction plate 29 or the second friction plate 30 based on the position of the second friction plate 30 detected by the detector 34 when the electromagnet 32 is in a demagnetized state. Therefore the wind turbine driving device 1a may be configured such that the amount of wear of at least the first friction plate 29 or the second friction plate 30 or both is detected by detecting the position of the second friction plate 30 using the detector 34 when the electromagnet 32 is in a demagnetized state.

INDUSTRIAL APPLICABILITY

The invention can be widely applied as a wind turbine driving device that drives a nacelle provided rotatably relative to a tower of the wind turbine or blades configured to be rockable in a pitch direction with respect to a rotor attached to the nacelle and applied as a wind turbine driving device unit that includes a plurality of such wind turbine driving devices.

LIST OF REFERENCE NUMBERS 1 wind turbine driving device
22 electric motor
22a output shaft
24 speed reducer
25 output portion
25a pinion
29 first friction plate
30 second friction plate
31 elastic members
32 electromagnet
33 detection target portion
34 detector
101 wind turbine
102 tower
103 nacelle

What is claimed is:

1. A wind turbine driving device unit that includes a plurality of wind turbine driving devices, each of the plurality of the wind turbine driving devices drives a nacelle provided rotatably with respect to a tower of a wind turbine or blades provided rockably in a pitch direction with respect to a rotor attached to the nacelle, each of the plurality of the wind turbine devices comprising:
an electric motor;
a speed reducer coupled to an output shaft of the electric motor;
a pinion provided on an output portion that is coupled to the speed reducer and meshing with a ring gear provided on the wind turbine;

a first friction plate coupled to the output shaft at an end of the output shaft opposite to an end that faces the speed reducer;
a second friction plate configured to contact the first friction plate and configured to generate a braking force to stop rotation of the output shaft by contacting the first friction plate;
an elastic member configured to bias the second friction plate toward the first friction plate;
an electromagnet configured to magnetically attract the second friction plate to bias the second friction plate in a direction in which the second friction plate is separated from the first friction plate;
a detection target portion fixed on the second friction plate; and
a detector configured to detect a position and a displacement of the detection target portion that is displaced along with the second friction plate,
wherein, based on a result of detection performed by the detector, operation of the second friction plate is detected and checked, and the amount of wear of at least the first friction plate, the second friction plate, or both is detected,
the wind turbine driving device unit comprising:
a control unit controlling operations of the plurality of wind turbine driving devices, wherein the plurality of wind turbine driving devices is disposed to correspond to the ring gear on the wind turbine,
wherein the detectors in the plurality of wind turbine driving devices are coupled to the control unit to output detection results to the control unit,
wherein the control unit is configured to check the operation of the second friction plate based on the position and the displacement of the second friction plate detected by the detector when the electromagnet is transitioned from a demagnetized state to an excited state,
wherein the control unit is further configured to stop operations of the electric motors in all the plurality of wind turbine driving devices in a case where a zero-displacement state or an insufficient displacement state of the second friction plate is detected in any of the plurality of wind turbine driving devices when the electromagnet is transitioned from the demagnetized state to the excited state,
wherein the position of the second friction plate is unchanged in the zero-displacement state when the electromagnet is transitioned from the demagnetized state to the excited state, and
wherein the second friction plate is attracted by a magnetic force of the electromagnet but underreaches a predetermined position in the insufficient displacement state when the electromagnet is transitioned from the demagnetized state to the excited state.

2. The wind turbine driving device unit of claim 1,
wherein the amount of wear of at least the first friction plate, the second friction plate, or both is detected by detecting the position of the second friction plate by the detector when the electromagnet is in the demagnetized state.

3. The wind turbine driving device unit of claim 1,
wherein the amount of wear of at least the first friction plate, the second friction plate, or both is detected by detecting the displacement of the second friction plate by the detector when the electromagnet is transitioned from the demagnetized state to the excited state or when the electromagnet is transitioned from the excited state to the demagnetized state.

4. The wind turbine driving device unit of claim 1, wherein the control unit demagnetizes the electromagnets in all the plurality of the wind turbine driving devices when the control unit stops the operations of the electric motors in all the plurality of wind turbine driving devices.

5. A wind turbine driving device unit of claim 1,
wherein the control unit is configured to check the operation of the second friction plate and detect the amount of wear of at least the first friction plate, the second friction plate, or both based on the detection results from the detectors, and
wherein, when the wear amount is equal to or larger than a predetermined value in any of the plurality of wind turbine driving devices, the control unit transmits a replacement-required command to an upper-level control device, the upper-level control device coupled to the control unit and configured to control operation of the wind turbine, and
wherein the replacement-required command notifies that replacement of the first friction plate and the second friction plate in the wind turbine driving device in which the wear amount is equal to or more than the predetermined value is required.

* * * * *